United States Patent [19]
Fukunaga et al.

[11] Patent Number: 5,706,064
[45] Date of Patent: Jan. 6, 1998

[54] LCD HAVING AN ORGANIC-INORGANIC HYBRID GLASS FUNCTIONAL LAYER

[75] Inventors: Yoko Fukunaga, Yokohama, Japan; Yoshiko Tsuji, Pasadena, Calif.; Mitsushi Ikeda, Yokohama, Japan; Masaru Nikaido, Fukaya, Japan; Shoichi Kurauchi, Yokohama, Japan

[73] Assignee: Kabushiki Kaisha Toshiba, Kawasaki, Japan

[21] Appl. No.: 623,712

[22] Filed: Mar. 29, 1996

[30] Foreign Application Priority Data

Mar. 31, 1995 [JP] Japan ................. 7-074320
Jun. 21, 1995 [JP] Japan ................. 7-154546

[51] Int. Cl.$^6$ ............. G02F 1/136; G02F 1/1335; G02F 1/1333
[52] U.S. Cl. ............. 349/43; 349/53; 349/106; 349/111; 349/138
[58] Field of Search ............. 349/42, 46, 138, 349/139, 155, 43, 52, 53, 39, 106, 110, 111

[56] References Cited

U.S. PATENT DOCUMENTS

| | | | |
|---|---|---|---|
| 4,712,874 | 12/1987 | Sekimura et al. | 349/138 |
| 5,153,753 | 10/1992 | Ohta et al. | 349/51 |
| 5,321,535 | 6/1994 | Ukai et al. | 349/39 |
| 5,321,538 | 6/1994 | Maruyama et al. | 349/138 |
| 5,503,932 | 4/1996 | Sakai et al. | 349/155 |
| 5,517,343 | 5/1996 | Yamahara et al. | 349/139 |
| 5,520,855 | 5/1996 | Ito et al. | 349/106 |

Primary Examiner—William L. Sikes
Assistant Examiner—Walter Malinowski
Attorney, Agent, or Firm—Oblon, Spivak, McClelland, Maier & Neustadt, P.C.

[57] ABSTRACT

The present invention includes a substrate for a display device and a liquid crystal display device using the same having a functional layer at least partially made of an organic-inorganic hybrid glass. The present invention includes a method of manufacturing a substrate for a display device having the steps of forming a switching element on a substrate, forming a polysilane layer on the substrate, irradiating ultraviolet light to the polysilane layer, to form a latent image for a pattern, dipping the substrate into a dipping solution so that a material of the dipping solution soaks into the exposed portion, vitrificating the exposed portion by heating. According to the method, a pattern having different regions in characteristics (insulating, conductive, and coloring) can be formed easily by changing in composition of the dipping solution.

20 Claims, 23 Drawing Sheets

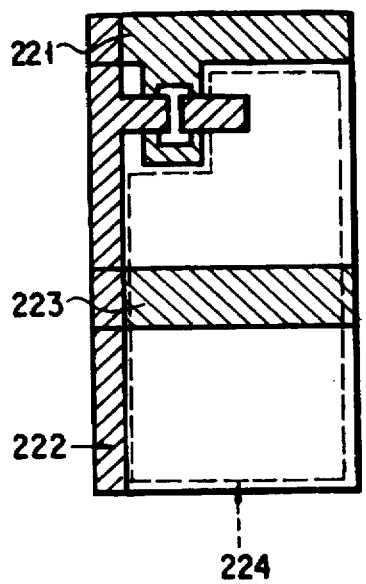
F I G. 2A
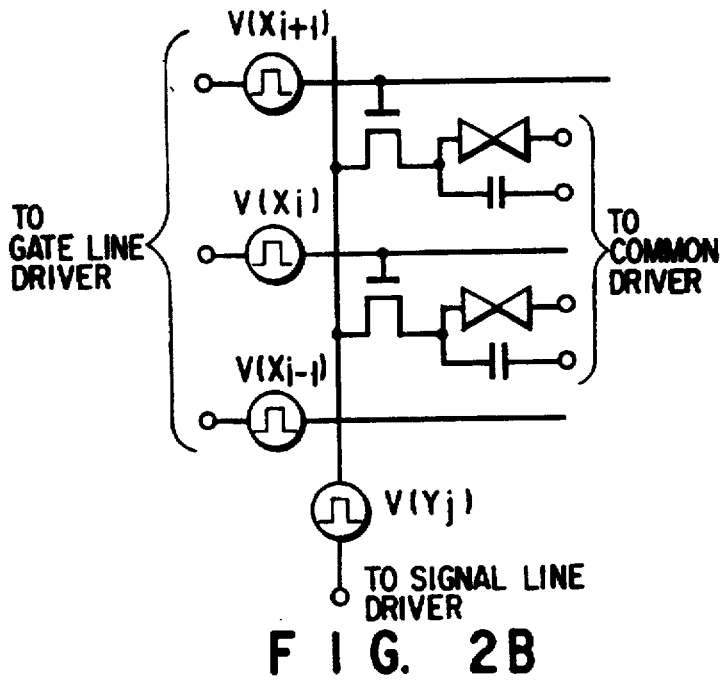
F I G. 2B
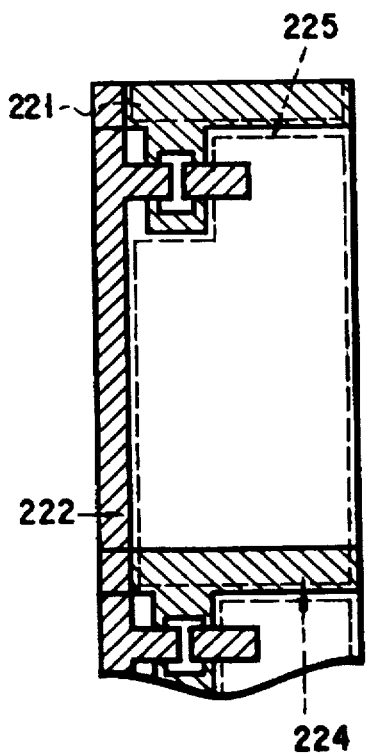
F I G. 3A
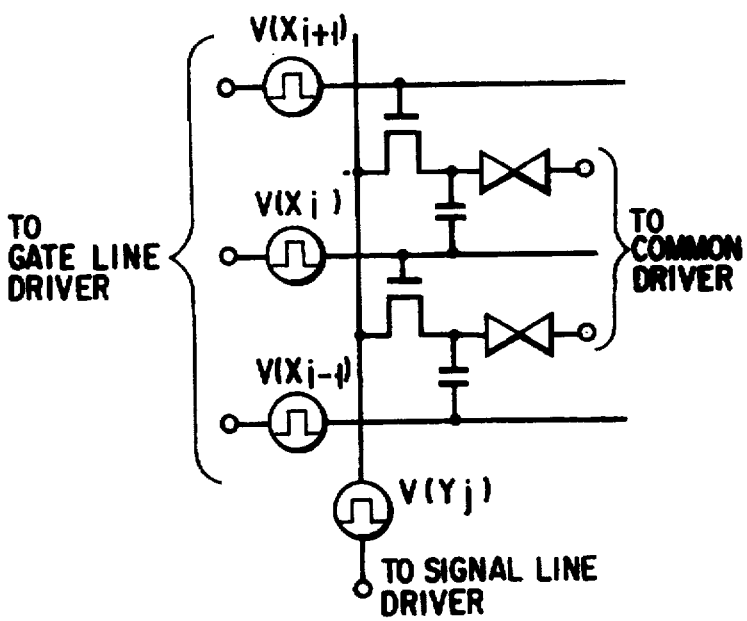
F I G. 3B

PAD PORTION

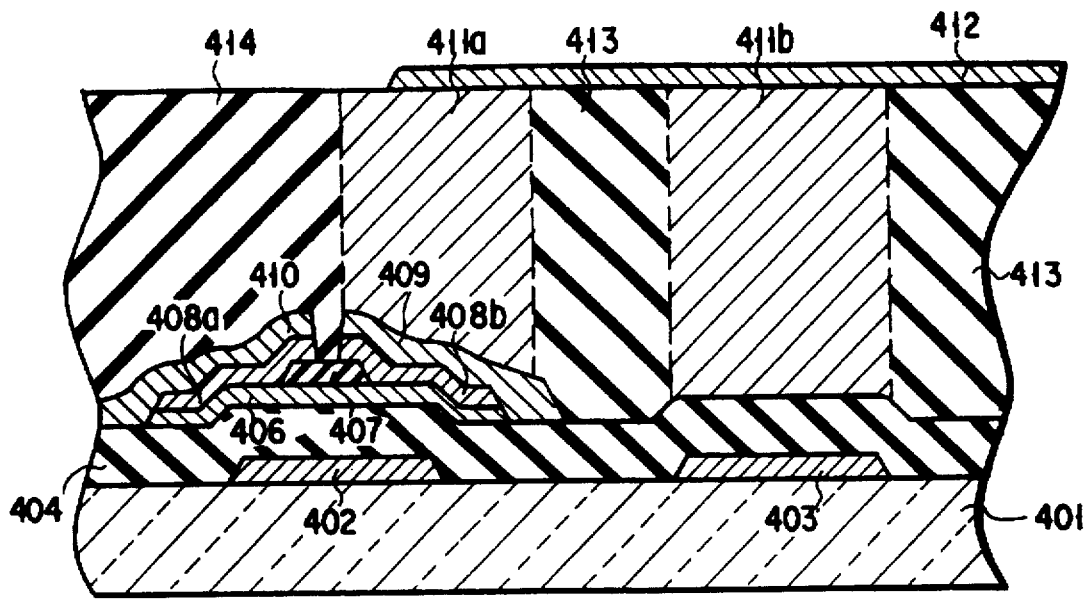
F I G. 15
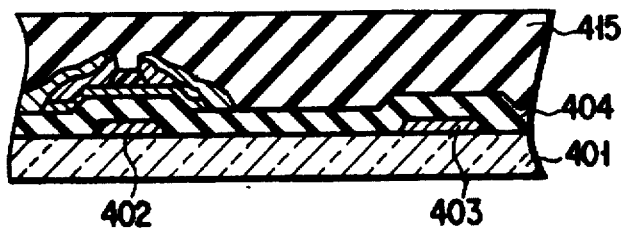
F I G. 16A
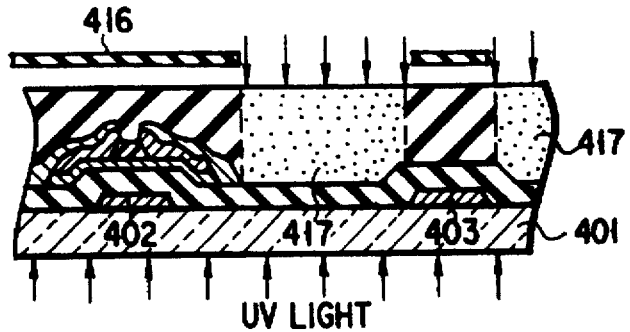
F I G. 16B
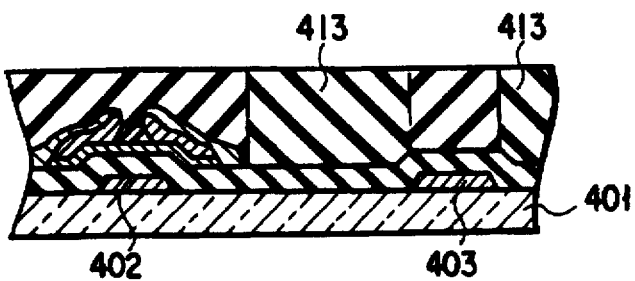
F I G. 16C

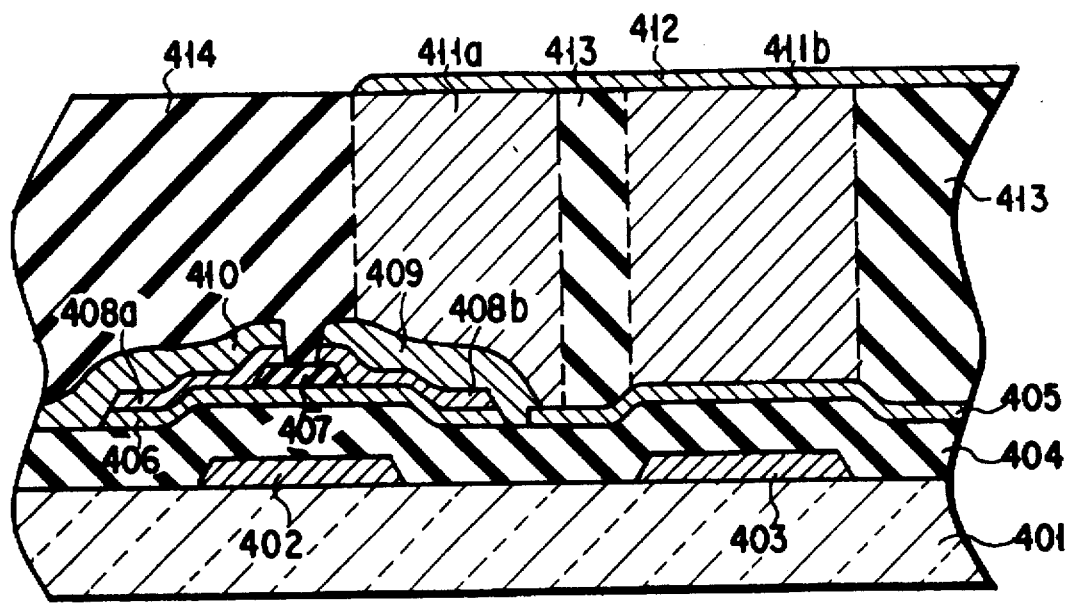
F I G. 17
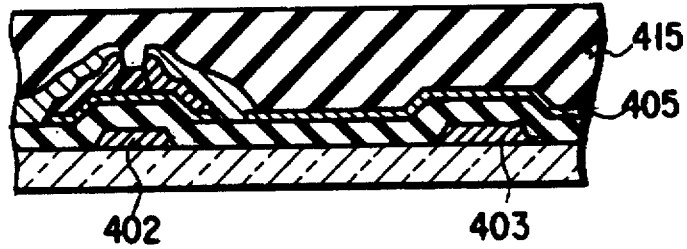
F I G. 18A
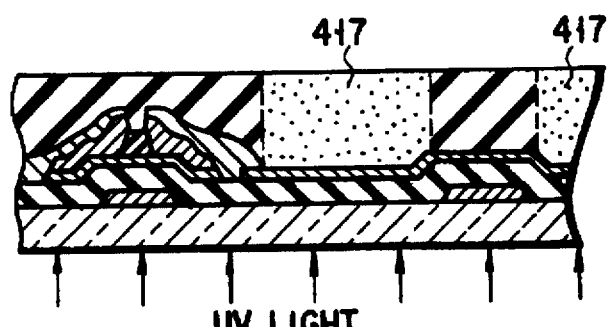
F I G. 18B
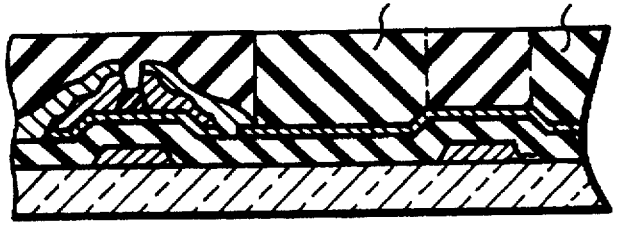
F I G. 18C

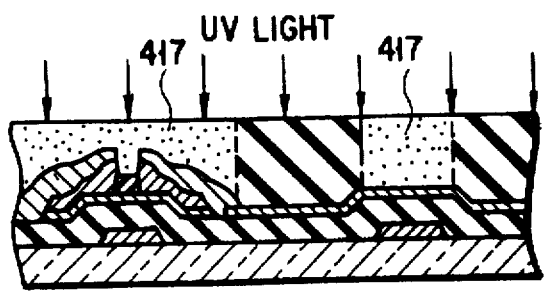
F I G. 18D
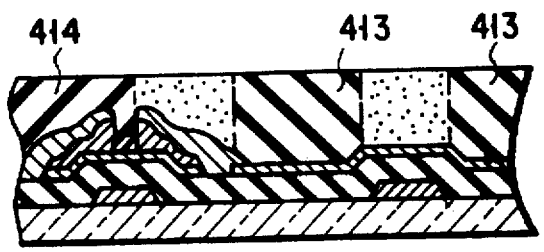
F I G. 18E
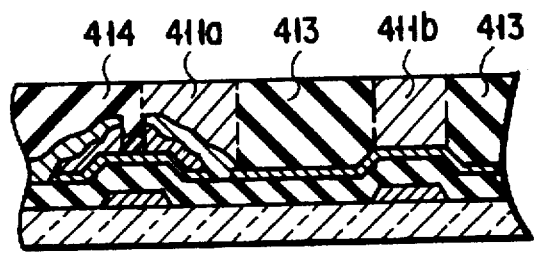
F I G. 18F
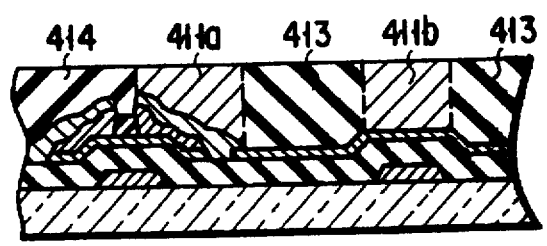
F I G. 18G
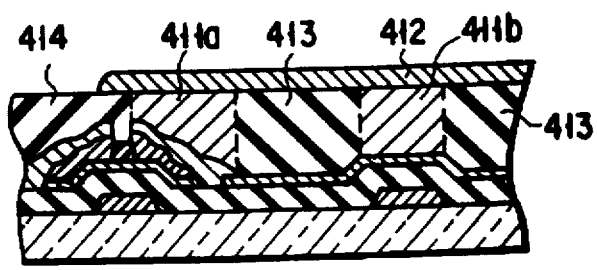
F I G. 18H

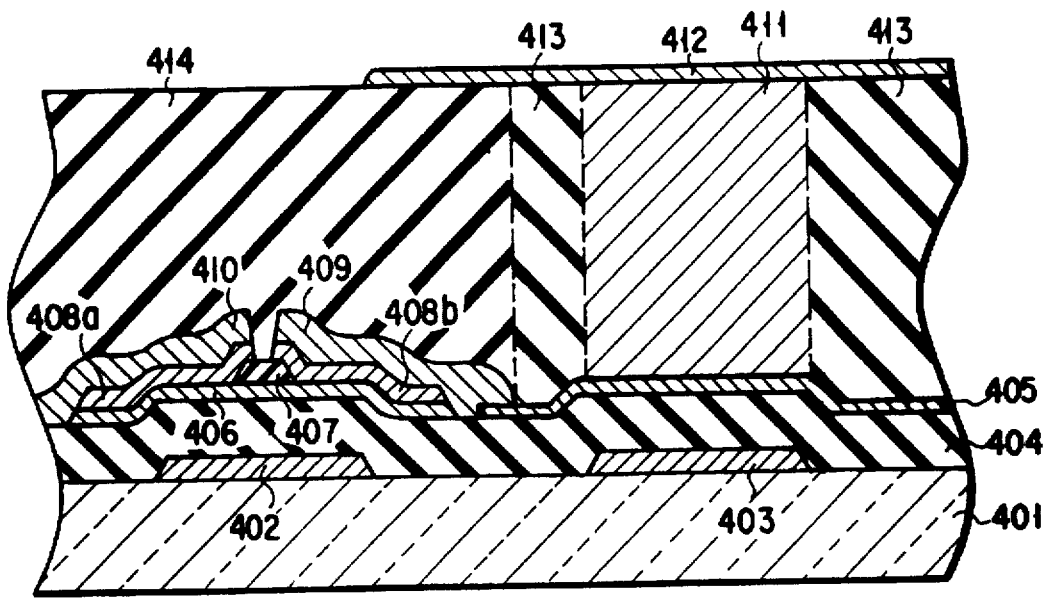
F I G. 19
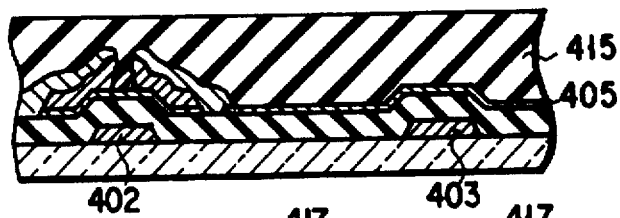
F I G. 20A
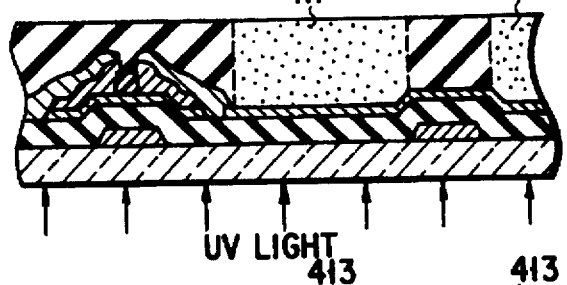
F I G. 20B
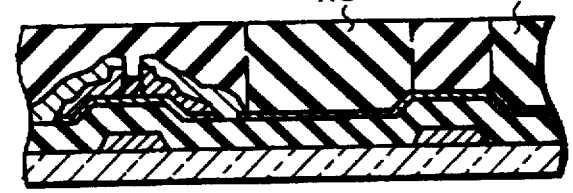
F I G. 20C
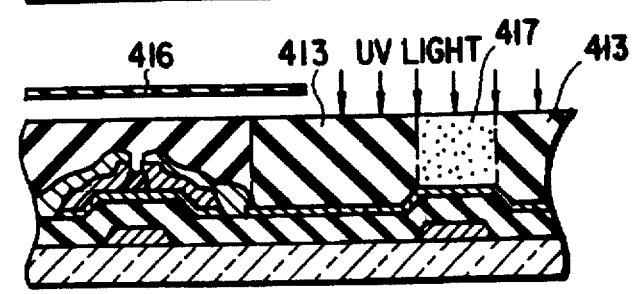
F I G. 20D

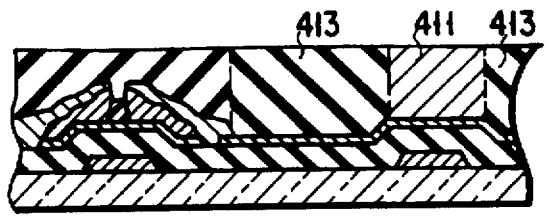
F I G. 20E
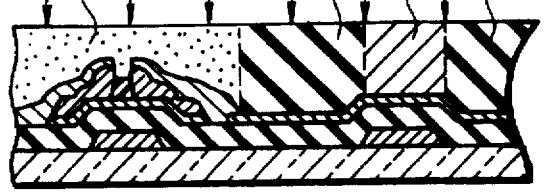
F I G. 20F
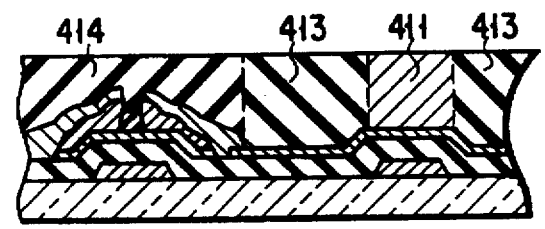
F I G. 20G
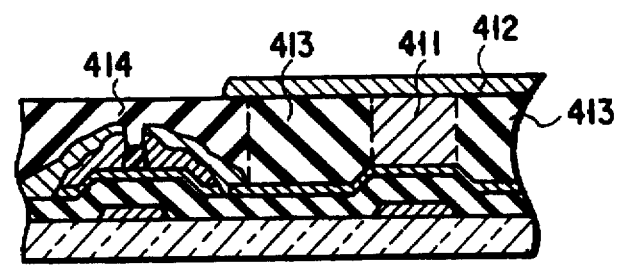
F I G. 20H
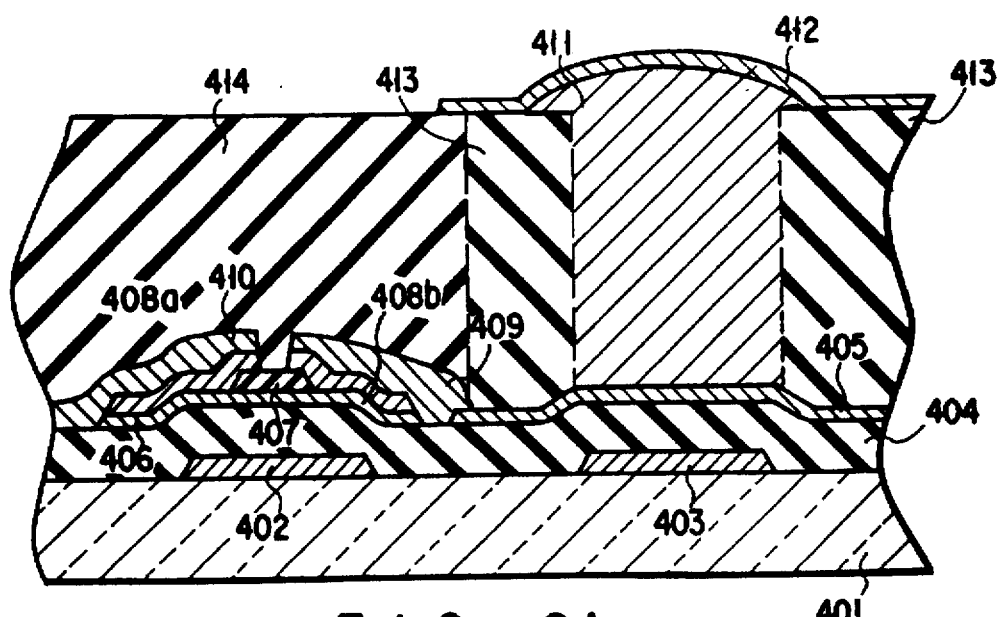
F I G. 21

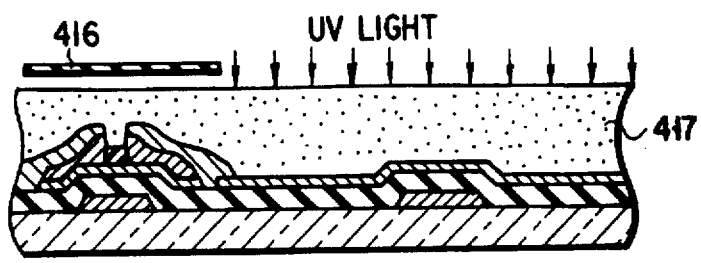
F I G. 24B
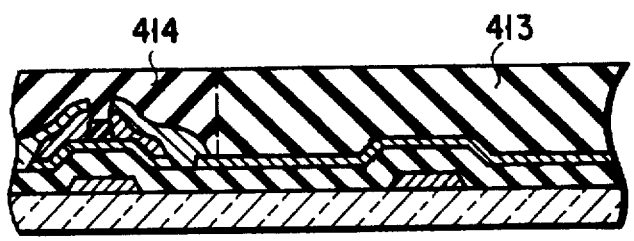
F I G. 24C
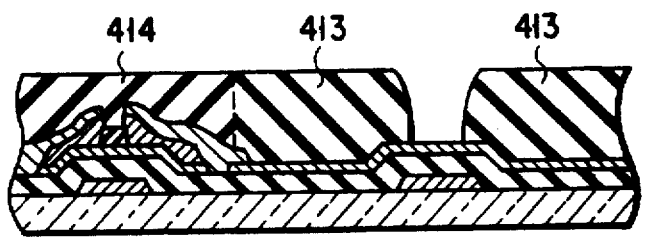
F I G. 24D
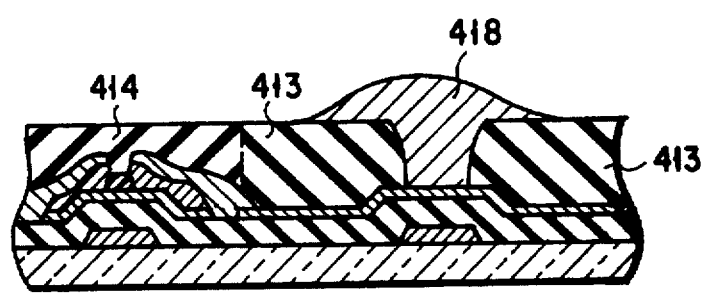
F I G. 24E
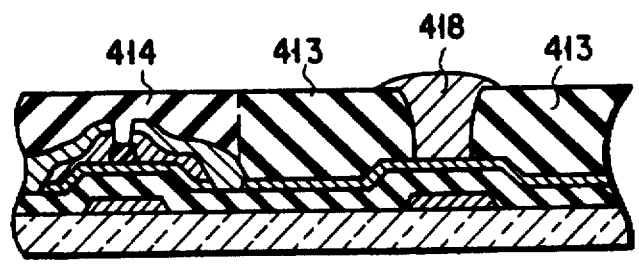
F I G. 24F
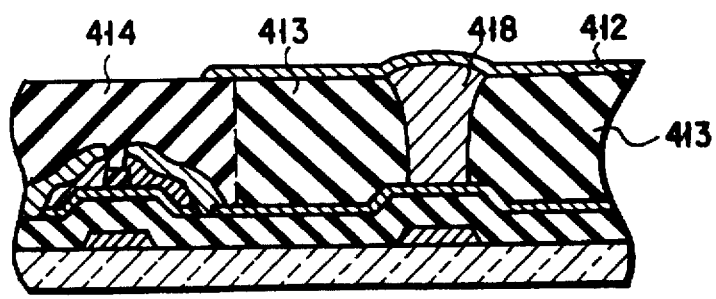
F I G. 24G

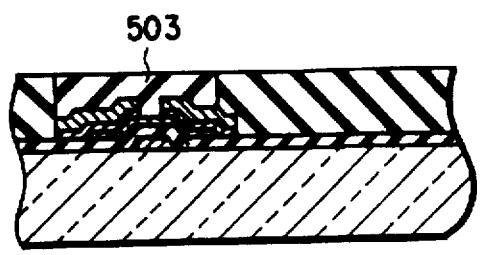
F I G. 28H
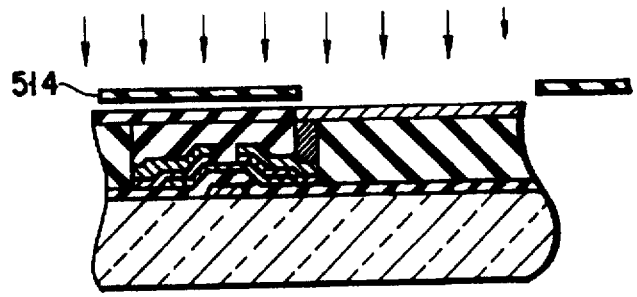
F I G. 28J
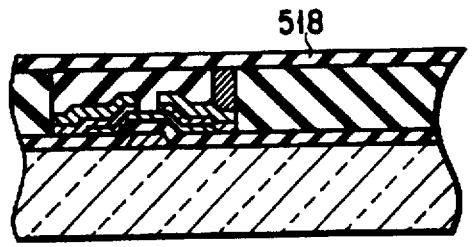
F I G. 28I
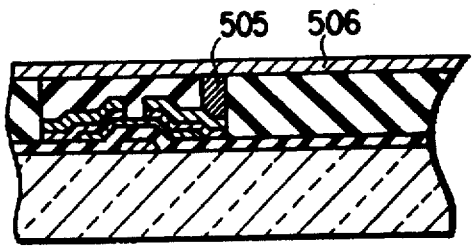
F I G. 28K
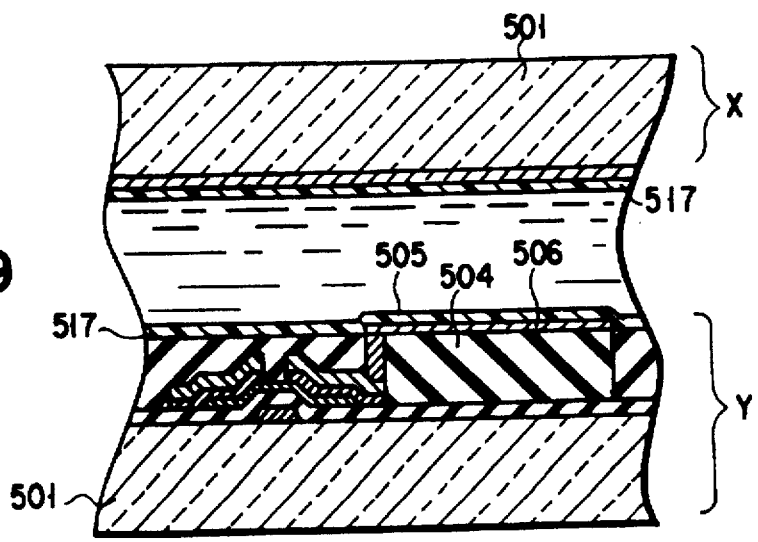
F I G. 29

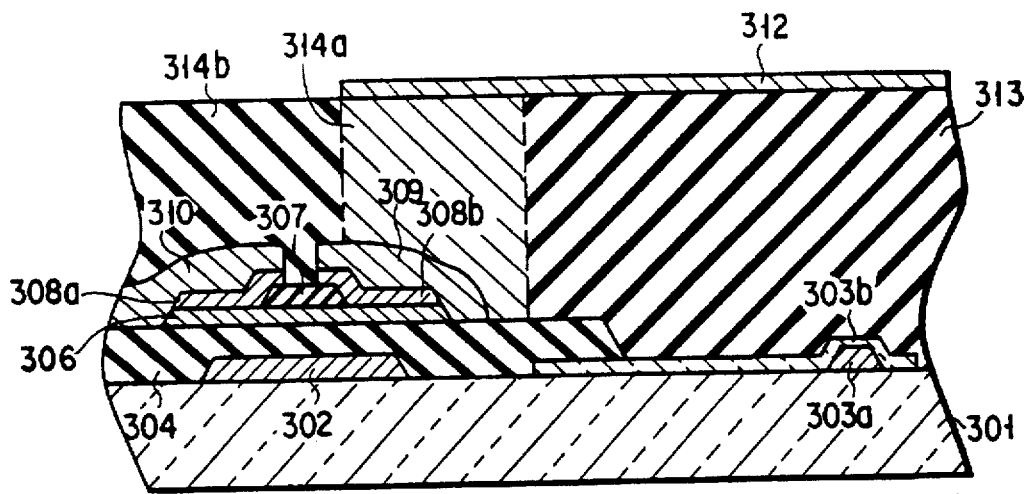
F I G. 30
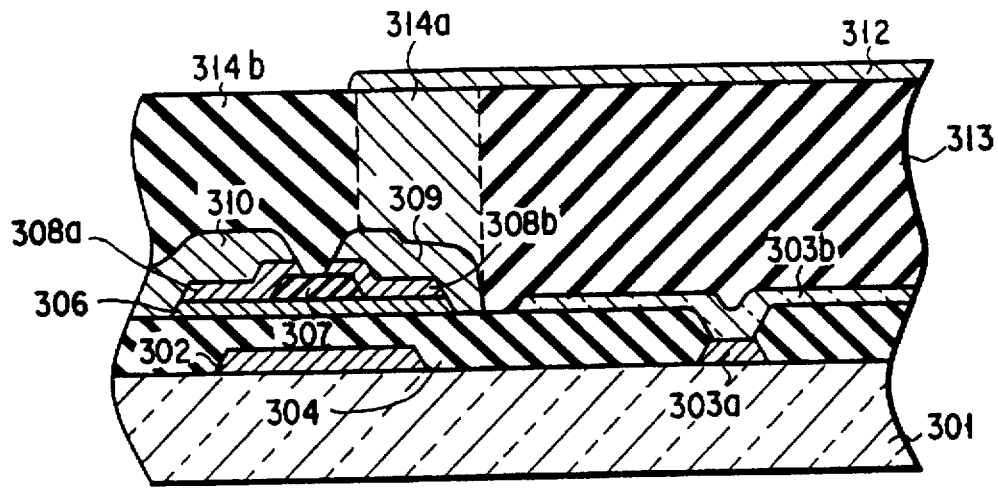
F I G. 31
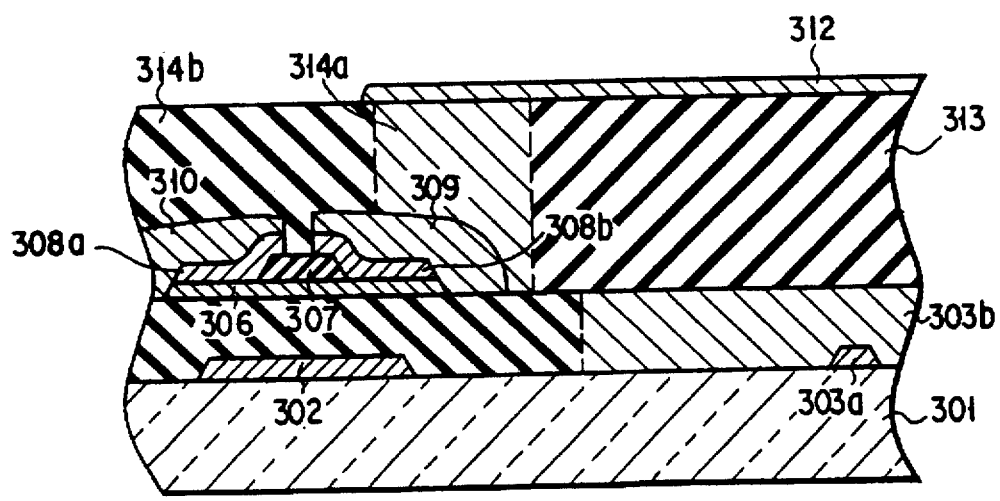
F I G. 32

LCD HAVING AN ORGANIC-INORGANIC HYBRID GLASS FUNCTIONAL LAYER

BACKGROUND OF THE INVENTION

1. Field of the Invention

The present invention relates to a substrate for a liquid crystal display, having a switching device in each pixel, and a liquid crystal display device using the substrate.

2. Description of the Related Art

In recent years, attention has been paid to an active matrix type liquid crystal display (LCD) in which thin film transistors (TFTs) using non-crystal silicon (a-Si) are respectively used as switching elements for pixel elements, since this display device has high image quality. This kind of display device has been widely used as a display device in a personal computer or the like. Further, if it is possible to realize an active matrix type liquid crystal display device with high image quality and a large screen size, there will be a possibility that such a display device can be used as a wall television (or a flat-type television). Therefore, this kind of active matrix type display device has been much expected. In order that an active matrix type liquid crystal display device is replaced with a CRT, the response speed must be improved to be so high that moving pictures can be displayed, the price of a screen in a 15-inch size class must be lowered, and the characteristic of low power consumption as a feature of a liquid crystal display may not degraded.

The response speed can be improved to be higher than the TN (Twisted Nematic) method currently used (e.g., up to 100 ms), by selecting a PT (ρ-Twist) method, a HAN (Hybrid Aligned Nematic) method, AFLC (Antiferroelectric Liquid Crystal) method, or an IPS (In Plane Switching) method. However, these method have a technical problem that the cell gap control accuracy is more severe than in the current TN method.

To achieve a large size screen, in a conventional liquid crystal display device in which a color filter and a black matrix are formed on an opposing substrate, there is a problem that a positioning offset between an array substrate (or a substrate having a TFT array) and an opposing substrate appears more apparently as the screen size of the display becomes larger. In order to prevent this problem, the black matrix which covers the positioning offset defective portion must be larger than a conventional apparatus. If the black matrix portion is thus enlarged, the aperture must then be lowered. If the aperture is low, then sufficient brightness cannot be attained as long as the brightness of a back-light must be high. As a result of this, it is not possible to respond to demands for low power consumption.

SUMMARY OF THE INVENTION

The present invention has been made in view of the above situation, and has an object of providing a substrate for a display device which can be used in liquid crystal in a high speed response mode, can also be used in a large screen display, and achieves a low price.

The present invention therefore provides a substrate for a display device, comprising a switching element provided on a substrate, and a functional layer which is formed on the substrate and at least a part of which is formed of organic-inorganic hybrid glass, a liquid crystal display device using the substrate, and a manufacturing process thereof.

The substrate for the display device of the present invention is characterized in the following features:

(1) A functional layer is provided on a switching element, and a pixel portion in the functional layer is formed of conductive organic-inorganic hybrid glass.

(2) A functional layer is provided on a switching layer, a pixel electrode is provided on the functional layer, a pixel portion of the functional layer is formed of insulating organic-inorganic hybrid glass, and a connecting portion between the pixel electrode and the switching element in the functional layer is formed of conductive organic-inorganic hybrid glass or conductive polymer.

(3) A functional layer is provided between a storage capacity line and a pixel electrode, that portion of the functional layer which is inserted between the storage capacity line and the pixel electrode is formed of organic-inorganic hybrid glass, the organic-inorganic hybrid glass functions as an insulating layer of a capacitor for storage capacity, or a functional layer is formed between a gate line and a semiconductor layer in a switching element, that portion of the functional layer which is inserted between a gate line and a semiconductor layer is formed of insulating organic-inorganic hybrid glass, and the organic-inorganic hybrid glass functions as a gate insulating film.

(4) A functional layer is provided on a switching element, an insulating film is formed on the functional layer, a pixel electrode is provided on the insulating film, a pixel portion in the functional layer is formed of insulating organic-inorganic hybrid glass.

BRIEF DESCRIPTION OF THE DRAWINGS

FIG. 2A is a plan view of a TFT substrate in which a gate line and a Cs line are independent from each other;

FIG. 2B is an equivalent circuit diagram of the TFT substrate shown in FIG. 2A;

FIG. 3A is a plan view showing a TFT substrate of a Cs ON-gate structure;

FIG. 3B is an equivalent circuit diagram of the TFT substrate shown in FIG. 3A;

FIGS. 15, 17, 19, 21 and 22 are cross-sections showing the substrate for a display device, according to Embodiment 2;

FIGS. 16A to 16H are cross-sections explaining the method of manufacturing the substrate for the display device shown in FIG. 15;

FIGS. 18A to 18H are cross-sections explaining the method of manufacturing the substrate for the display device shown in FIG. 17;

FIGS. 20A to 20H are cross-sections explaining the method of manufacturing the substrate for the display device shown in FIG. 19;

FIGS. 23A to 23I and FIGS. 24A to 24G are cross-sections explaining the methods of manufacturing the substrate for the display device, shown in FIGS. 21 and 22;

FIGS. 27 and 29 are cross-sections showing the method of manufacturing the display device according to Embodiment 2;

FIGS. 28A to 28K are cross-sections showing the method of manufacturing the substrate for the display device shown in FIG. 27;

FIGS. 30 to 34 are cross-sections showing the substrate for a display device, according to Embodiment 3.

DETAILED DESCRIPTION OF THE PREFERRED EMBODIMENTS

Figure 1A:
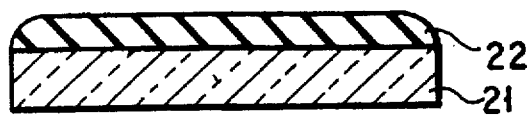
FIGS. 1A to 1D are cross-sections showing steps of manufacturing a substrate for a display device.

In order that CRTs are replaced with color liquid crystal display devices, color liquid crystal display devices must have higher speed response, must be applicable to a display of a large-size screen, must be available at low prices, and must operate with low power consumption. To satisfy these requirements, the following problems must be solved. Specifically, almost of liquid crystal display modes which have higher responsibility require severe gap control accuracy, and therefore, it is necessary to ensure high gap control accuracy, to reduce the number of manufacturing steps to improve the manufacturing yield, to also reduce materials, and to maintain the aperture, in case of a large-size screen.

Under these circumstances, the present inventors have prepared a liquid crystal display of a color filter on-array structure in a size of 15 inches with use of PT, HAN, AFLC, and IPS as a display mode, using a pigment dispersion method, in order to solve these problems.

As a result of this, in any of the cases, light leakage occurred at a region near the black matrix portion at the opening portion. In addition, display non-uniformity occurred at the peripheral regions of the screen. The inventors investigated reasons of light leakage to find that the gap of the color filter, i.e., the difference between the height of the color filter formed on a black matrix portion and the height of the color filter formed on the other regions. Especially, the display methods as described above are sensitive to a cell gap, and therefore resulted in that an influence from the gap apparently appeared.

In addition, the inventors investigated the display non-uniformity to find that there is a variation in the TFT characteristic (i.e., the voltages at which the TFT is turned on/off), and that this variation is caused due to the color filter preparation steps using the dye dispersion method. Specifically, in the dye dispersion method, the process of resist application, exposure, development and baking must be performed in this order for color portions of R, G, and B and the black matrix portion. Therefore, it is considered that TFTs receive much burdens. In addition, the large size of a screen tends to cause generation of temperature distribution in the process.

Further, since color filter preparation using the dye dispersion method includes a large number of manufacturing steps, so that the manufacturing yield cannot be increased, much material is consumed in vain, and the price cannot be reduced.

Therefore, the present inventors paid attention to the facts that the method disclosed in Japanese Patent Application KOKAI Publication No. 5-188215, i.e., the method in which a color filter of organic-inorganic hybrid glass is formed through repetition of dipping into a dipping solution containing dye or pigment and heating achieves high flatness and that the manufacturing steps and material can be reduced in this method. Hence, the inventors invented the method of forming a functional layer through the method described above.

Then, a liquid crystal display of a high response mode having a size of 15 inches in which a color filter layer is provided in the above method was prepared. This liquid crystal display was evaluated and then, no light leakage defects nor non-uniformity defects have been found. However, the following four new problems have occurred.

The first problem lies in that a voltage distributed to a color filter layer caused a reduction in the effective voltage applied to the liquid crystal and the driving voltage increased from 5V of a conventional case to 10V, when a conventional TFT substrate was used and a color filter having a thickness of 1.5 μm showing an insulating characteristic was formed on the pixel electrode of the substrate.

A second problem as follows. An ITO film is formed on the surface of the color filter layer by sputtering after a through-hole was formed in the color filter layer to solve the first problem, and the ITO film was subjected to etching to form a pixel electrode pattern. Then, many of the contacts between switching elements and pixel electrodes are defective, and further, side-etching occurred so that fine processing cannot be achieved.

The present invention has an object of overcoming the above problems which have been occur when forming a layer containing organic-inorganic hybrid glass, and of providing a liquid crystal display device and a substrate for the display device, which are applicable to a high response mode and realize a large-size screen display at a low cost.

The present invention provides a substrate for a display device, switching elements provided on a substrate and a functional layer at least a part of which is formed of organic-inorganic hybrid glass.

In the present invention, the term of a functional layer means a layer which has functions of electrical characteristics such as a conductivity property, an insulating characteristic, and a dielectric constant and also has functions of optical characteristics such as coloring characteristics, transparency, refraction index, convergence, and light diffusivity. In addition, the functional layer may effectively have both of the characteristics. In the present invention, portions of two or more functions which are of different electric characteristics or are of different optical characteristics are patterned in one single layer, and the present invention is characterized in that the material of the portions is made of organic-inorganic hybrid glass.

As a switching element, for example, a TFT (or a thin film transistor) or an MIM (or a metal insulator metal) can be used.

When a thin film transistor (TFT) is used as a switching element, it is possible to adopts TFT structures, e.g., a positive staggered type in which the gate electrode is positioned opposite to the substrate and the source electrode and the drain electrode are positioned opposite to the gate electrode, as well as a negative staggered type in which the gate electrode is positioned in the substrate side and the source electrode and the drain electrode are positioned opposite to the gate electrode. Further, the negative staggered type structure is divided into several types, e.g., a back channel type in which a-Si and n⁺a-Si are simultaneously removed, and an i-stopper type in which an etching stopper exists on the a-Si. Either of these types can be used.

A semiconductor layer for use in a TFT is not limited to a-Si, but p-Si and CdSe may be used to form the semiconductor layer. In addition, an insulating layer on a data line is not limited to SiOx, but may be of SiNx, or this layer may be a multi-layer consisting of SiOx and SiNx.

For each pixel of the TFT substrate, a storage capacitor is formed to be in parallel with a liquid crystal capacitor, in view of an equivalent circuit. The storage capacity (Cs, storage capacitor) means a capacitor which reduces signal voltage dependency of the liquid crystal capacitor and influences from a parasitic capacity, thereby to increase the time-constant of the holding circuit so that the image quality is ensured. An electrode of the capacitor also serves as a pixel electrode.

The substrate for a display device in the present invention includes the independent Cs structure shown in FIG. 2A and the Cs on-gate structure shown in FIG. 3A. Equivalent circuits thereof are respectively shown in FIGS. 2B and 3B. Note that the reference 221 denotes a gate line, the reference 222 denotes a signal line, the reference 223 denotes a Cs line, and the references 224 and 225 denote pixel electrodes.

Here, the pixel electrode means an electrode for liquid crystal driving. In case of transparent type mode display other than IPS, transparent conductive material of metal-oxide based is effective as the material for the electrode. As this material, $SnO_2$ (NESA glass), non-doped $In_2O_3$, $SnO_2$ doped $In_2O_3$ (ITO), and ZnO may be used, or these materials may be used with a slight amount of $Al_2O_3$, $AlF_3$, $Ga_2O3$, $Y_2O_3$ and the likes being doped thereinto. Among them, it is especially effective to use $In_2O_3$ doped with $SnO_2$ at 5 weight%. As a method of forming a pixel electrode, it is possible to use a sputtering method, an EB method, a sol-gel method or the like.

In the present invention, as a substrate, it is possible to use a ceramics substrate, a resin substrate, a metal substrate, a grazed ceramics substrate, a resin-coated metal substrate or the like. Especially, as the material of the substrate, it is desirable to use low alkali glass, non-alkali glass, polycarbonate (PC) as a flexible substrate, polyether sylphone (PES) or the like.

In the present invention, organic-inorganic hybrid glass means glass in which organic molecules or organic grains are dispersed in inorganic glass. The material of inorganic glass of organic-inorganic hybrid glass will now be explained. Inorganic glass is basically made of metal oxide. Among them, as material of inorganic glass, the present invention singly uses $SiO_2$, $SnO_2$, $GeO_2$, $B_2O_3$, $ZnO_2$, $Al_2O_3$, $ZrO_2$, $Ti_2O_3$, $BaTiO_3$, $Cd_2SnO_4$, $Cu_2O$, $Ag_2O$, $SrTiO_3$, $LaCrO_3$, $LaCrO_3$, or $WO_3$, or uses a combination of them. Especially, it is desirable that the content of $SiO_2$, $GeO_2$, and/or $SnO_2$ in organic glass should be 30 volume % or more.

As material of conductive inorganic glass, it is effective o use $SnO_2$ (NESA glass), non-doped $In_2O_3$, $SnO_2$, doped $In_2O_3$ (ITO), and ZnO, or to use these materials doped with a slight amount of $Al_2O_3$, $AlF_3$, $Ga_2O_3$, $Y_2O_3$ or the like, or a mixture of these materials and $SiO_2$ and $ZrO_2$.

Figure 1B:
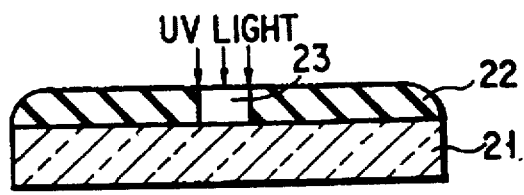
Figure 1C:
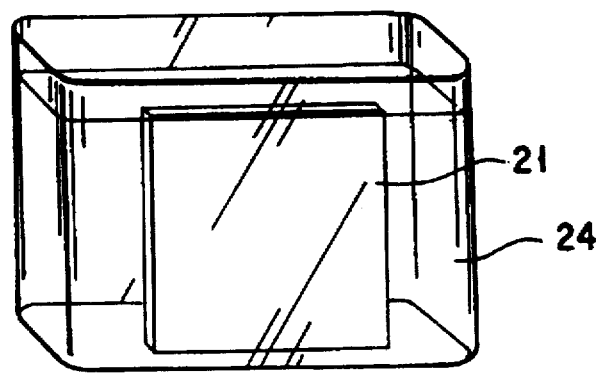
Figure 1D:
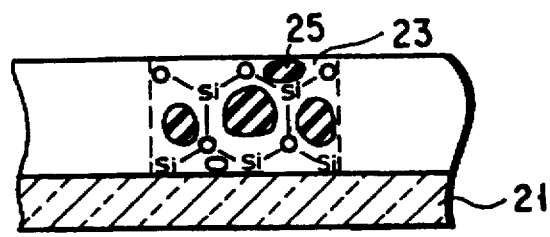

In the following, a method of forming a pattern having a predetermined function in a functional layer will be explained. As shown in FIG. 1A, photoresist 22 is applied onto a display device substrate (or an array substrate) 21, and ultraviolet light is irradiated onto predetermined portions (which should be equipped with functions), to form a latent image in the resist, as shown in FIG. 1B. As shown in FIG. 1C, the array substrate 21 is dipped in a dipping solution 24, and the array substrate 21 is heated after the dipping step, as shown in FIG. 1D, thereby selectively vitrifying exposed portions to make an oxide 25. In this method, the dipping solutions selectively enters into the exposed portions, and the exposed portions are vitrifying by baking, in a form in which the exposed portions take in the dipping solution composition. Further, those portions of the resist which are not vitrifying are exposed with ultraviolet light, to form a latent image of another pattern, and the substrate is dipped into a dipping solution different from the dipping solution described above, and is then subjected to baking. These steps are repeated to form regions which have desired electrical characteristics and optical characteristics. As for a method of making a dipping solution rapidly enter into desired regions, it is effective to perform electrochemical deposition process, with the array substrate being dipped in the dipping solution.

The composition of the dipping solution is selected depending on the characteristic to be applied to an exposed portion. For example, in case of rendering the exposed portion insulating, a sol-gel solution including water and TEOS (tetraethoxysilane) is used as a dipping solution. In this case, $SiO_2$ is formed at the exposed portion. In addition, in case of rendering an exposed portion conductive, a solution including conductive fine grains, an In complex, and an Sn complex is used as a dipping solution. In addition, when the exposed portion is colored, a sol-gel solution or electrochemical deposition solution including a pigment is used. Further, in case of adjusting the dielectric constant, another solution including a metal complex is used as a dipping solution.

Here, as the metal complex, metal alkoxide, metal acetyl acetonate, metal carboxylate, or the like may be used. Especially, as material for forming an ITO electrode, indiumacetylacetonate ($In(COCH_2COCH_3)$) and tinacetylacetonate ($Sn(COCH_2COCH_3)_4$) may be effectively used.

In the following, explanation will be made to the sol-gel method and the electrochemical deposition method used in the present invention. In the sol-gel method, a solution (or a sol solution) in which metal oxide fine grains are dissolved as hydrolysis and polymerization of metal complex proceed is used as a dipping solution, and selective entering of a sol solution into a liquid exposed portion is used.

In the electrochemical deposition method, a micell electrolytic solution is used as the dipping solution, and resist described above is used. This method utilizes entering of composites of a micell electrolytic solution in several tens seconds (or several minutes in case of dipping) at only those portions which are applied with a voltage (±5 to 10V) and irradiated with ultraviolet light. The portions which are applied with a voltage are decided by selecting a gate line and a signal line, and by controlling the voltage to be applied to the gate line and the signal line. As for the micell electrolytic solution, it is effective to use a water solution containing an electrolyte and ampliphilic PEG type interface activation ferrocene as shown in Formula 1. In addition, in order to proceed entering of composites of the micell electrolytic solution, it is effective to add acetonitrile, alcohol, and the like to the electrolytic solution, at a rate or 20 volume % or less.

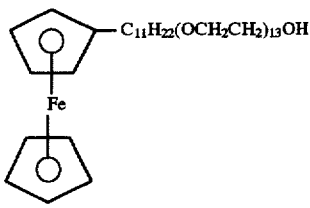

Formula 1

In addition, a method or the like of injecting a solution with use of an ink inject technique adopted in an ink jet technique or the like may be used in place of the dipping step as described above. When the method using the ink jet technique, occurrence of unevenness (or concave and convex portions) on the surface of the layer and generation of a pin-hole due to dissolving of polysilane into the dipping solution can be prevented when we use low molecular amount of polysilane.

The resist used in the present invention is one whose polarity (hydrophilic or hydrophobic property) changes depending on the ultraviolet light irradiation step as a post step. Specifically, use is made of resist which uses polysilane (Si—Si) and polytin (Sn—Sn) as a main chain and introduces hydrogen, an alkyl group, an aryl group, a benzene ring and the like as a side chain.

The resist is vitrified in the following manner. To recite polysilane as an example, hydrophobic polysilane is firstly exposed to light, then the main chain of the polysilane was cut, and it react with oxygen and water in the air, thereby being rendered hydrophilic (—SiOH). In this situation, when polysilane is dipped into a dipping solution, the dipping solution enters into only hydrophilic portions thereof. Thereafter, the resultant is subjected to a heating treatment (e.g., baking), so that the hydrophilic portion is hardened as quartz glass (—SiOH+-SiOH →—Si—O—Si—). In this state, the substituent of the side chain is embedded in the quartz glass. Those portions which have once undergone this step become quartz glass which is stable with respect to light and heat.

When a polysilane layer is formed, resin as described above is applied in form of a solution in which the resin is dissolved. However, as long as a uniform polysilane layer can be formed, the application method is not restricted. A method of forming a uniform polysilane layer is preferably a spin-coating method, a nozzle coating method, or the like.

In the present invention, if the functional layer is colored, colors are black, R, G, B, and the likes. A black region is formed at a position (at either above or below a wiring) corresponding to a thin transistor and the gate line and the signal line thereof, and is called a black matrix. R, G, and B regions are formed at positions corresponding to positions of pixel electrodes. The present invention may adopt a BM on-array in which a black matrix is formed and the position corresponding to the position of a pixel electrode is transparent, and R, G, and B regions are formed at the positions corresponding to pixel electrodes. The BM may be constructed in a structure in which the BM is formed on an opposing substrate, or in a structure in which BM regions and R, G, and B regions are formed.

When the functional layer is colored, colored organic dye or pigment are dispersed in colorless transparent organic-inorganic hybrid glass, to color the layer in R, G, and B (or Y, C, and M). In the BM (or black matrix), it is effective to use not only organic molecules but also black inorganic pigment. Organic molecules may be dispersed in form of molecules in inorganic glass, or may be dispersed in form of aggregations. However, when the organic molecules are dispersed in form of aggregations, the average grain diameter should be 0.2 μm or less in the R, G, and B regions, and 0.4 μm or less in the BM portion. In addition, in case where the organic molecules are dispersed in form of molecules in inorganic glass, in order to prevent elution into liquid crystal, the region of depth of 0.01 μm from the surface should not preferably contain the molecules. In other words, when the organic molecules are dispersed in form of molecules, a colorless transparent protect film should preferably be provided on the colored film.

In the next, colored material will be explained. As organic molecules, it is possible to use either dyes or pigments. When using pigments, the average grain diameter should preferable be 0.2 μm or less in the R, G, and B regions, and be 0.4 μm or less in the BM portion. In addition, the molecule frame should preferably be phthalocyanine based, anthraquinone based, isoindoline based, or dioxazine based one which has a high heat resistance and a high light resistance. The content amount of a coloring agent should preferably be 40 volume % or less with respect to inorganic glass. With respect to the BM portion, titanium oxide ($Ti_nO_{2n-1}$) as an inorganic pigment, and the same with nitrogen doped thereto may be used to make the color of black deeper.

Polysilane used in the present invention may be as follows.

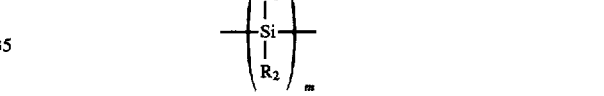

Formula 2

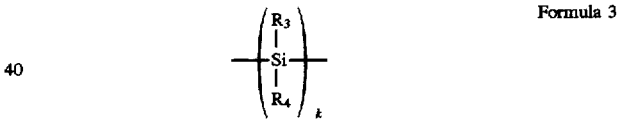

Formula 3

(where $R_1$, $R_2$, $R_3$, and $R_4$ are substituted or non-substituted aliphatic hydrocarbon remaining groups, alicyclic hydrocarbon remaining groups, aromatic hydrocarbon remaining groups, hydrogen, alkoxyl groups, or acyloxyl groups which are of an equal kind or different kinds, and where m and k are integers).

Polysilane is soluble in organic solvents, and may be such material which forms a uniform film having a thickness of about 0.1 to 5 μm after pre-baking. Polysilane has a tendency that the heat resistance and chemical resistance decrease as the molecule amount decreases. Therefore, if polysilane is used under a condition where a heat resistance and a chemical resistance are required, it is preferable that the molecule amount is 10,000 or more.

In addition, in the formulas 3 and 4 described above, $R_1$, $R_2$, $R_3$, and $R_4$ are groups independently selected from a group of substituted or non-substituted aliphatic hydrocarbon remaining groups such as a methyl group, an n-propyl group, an n-butyl group, an n-hexyl group, a phenylethyl group, a trifluoropropyl group and a fluorohexyl group; substituted or non-substituted aromatic hydrocarbon remaining groups such as a p-tolyl group, a biphenyl group, and a phenyl group; alicyclic hydrocarbon remaining groups such as a cyclohexyl group and a methylcyclohexyl group; hydrogen, an alkoxyl group, or a acyloxyl group.

Preferred examples thereof are polyphenylmethylsilane in which $R_1$ and $R_3$ are methyl groups and in which $R_2$ and $R_4$ are phenyl groups, polyphenylmethyl/methyltrifluoropropylsilane in which $R_1$ and $R_3$ are methyl groups, in which $R_2$ is a phenyl group, and $R_4$ is a trifluoropropyl group, a polyhydrophenylsilane in which $R_1$ and $R_3$ are hydrogen and $R_2$ and $R_4$ are phenyl groups, and a polyhydrophenylmethylsilane in which $R_1$ is hydrogen, $R_3$ is a methyl group, and $R_2$ and $R_4$ are phenyl groups.

Polysilane may be added with a bridging agent or other material, within a range in which the function of polysilane is not degraded, for the purpose of improving the heat resistance, chemical resistance, and mechanical strength of the color filter made from polysilane, or for the purpose of ensuring a uniform conductivity property.

As a bridging agent which can be added to polysilane, a silicon rubber composite can be used which contains a silicon oil having silanol groups at both ends such as polydimethylsiloxanediol, 3-functional silane such as acetoxysilane, oximesilane, or aminooxysilane, and a metal catalyst such as a tin compound or a platinum compound. A preferred composition ratio of this silicon rubber composite is silicon oil of 100 weight part, 3-functional silane 1 to 10 weight part, and a metal catalyst of 0.05 to 1 weight part. A preferred addition amount of this silicon rubber composite to polysilane is 0.1 to 20 weight part with respect to polysilane of 100 weight part. In particular, 1 to 10 weight part is preferable.

In addition, material which can be added to polysilane is a ester-based compound such as phthalic acid esters, aromatic carbon acid esters, aliphatic esters, esters of polyvalent alcohol, and phosphoric esters. A preferred mix proportion of the material described above is 10 to 50 weight part, and more preferably, 25 to 35 weight part with respect to polysilane of 100 weight part. Addition of a ester compound to polysilane results in improvements in mechanical strength of a color filter layer, and improvements in sensitivity to ultraviolet light, thereby to reduce the exposure time.

Figure 4:
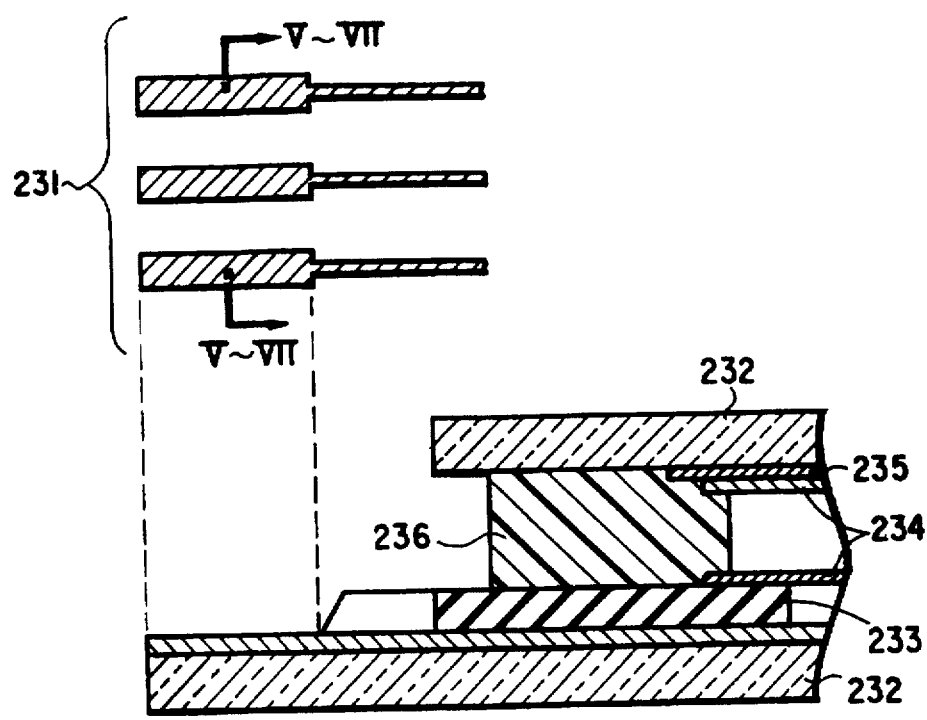
FIG. 4 is a view for explaining a pad portion of a liquid crystal display device in the present invention.

In the present invention, in order to ensure a conductive condition of an external terminal which is used to connect the liquid crystal display device to an external driver, various process must be performed. Specifically, as shown in FIG. 4, it is necessary to securely maintain a conductive condition on each pad 231a of an external terminal (or pad group region) 231 on a gate line or a signal line. Therefore, insulating organic-inorganic hybrid glass must be removed. Note that, in FIG. 4, the reference 232 denotes a substrate, the reference 233 denotes a BM edge portion, the reference 234 denotes an orientation film, the reference 235 denotes an opposing electrode, and the reference 236 denotes a seal.

Figure 6:
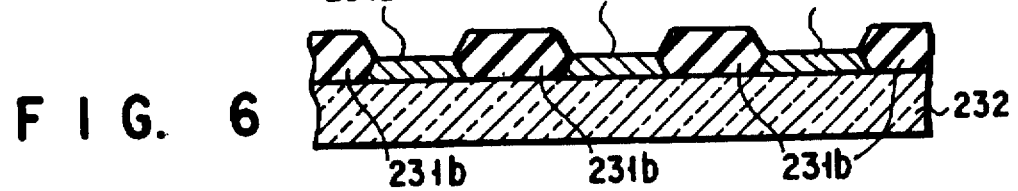
Figure 7:
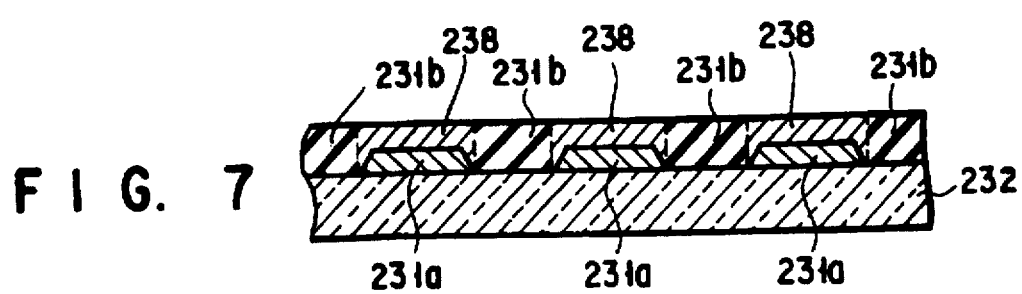

In the pad group portion 231, all the resist on the pad group region 231 may be removed. As shown in FIG. 6, only the resist on each pad 231a may be removed, and regions between respective pads 231a may be formed of insulating organic-inorganic hybrid glass 231b. As shown in FIG. 7, conductive organic-inorganic hybrid glass 238 may be provided on each pad portion 231a and regions between pad portions 231a may be formed of insulating organic-inorganic hybrid glass 231b.

Figure 5:
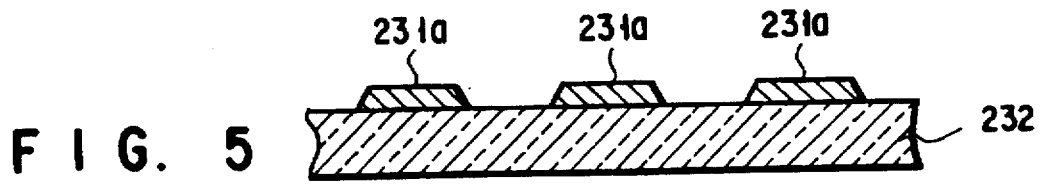
FIGS. 5 to 7 are views for explaining a pad portion of the liquid crystal display device in the present invention.
Figure 8A:
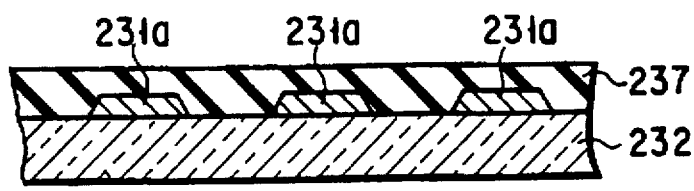
FIGS. 8A and 8B are cross-sections showing a step of preparing the pad portion shown in FIG. 5.
Figure 8B:
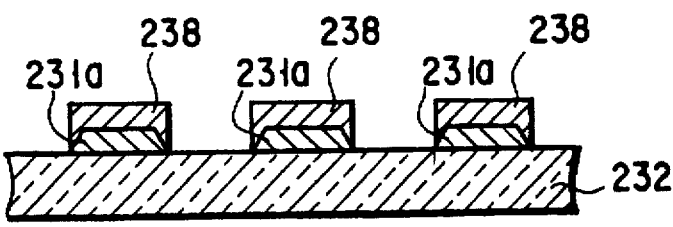

The structure shown in FIG. 5 is formed by removing polysilane resist through a solvent washing step as shown in FIG. 8B after applying polysilane resist 237 onto an array substrate 232 as shown in FIG. 8A.

Figure 9A:
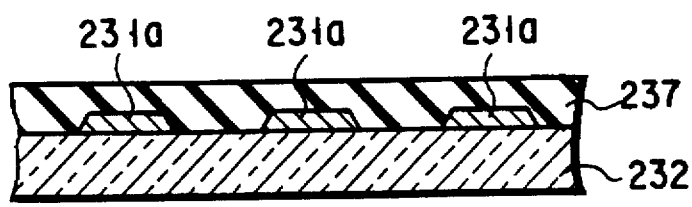
FIGS. 9A to 9D are cross sections showing a step of preparing the pad portion shown in FIG. 6.
Figure 9B:
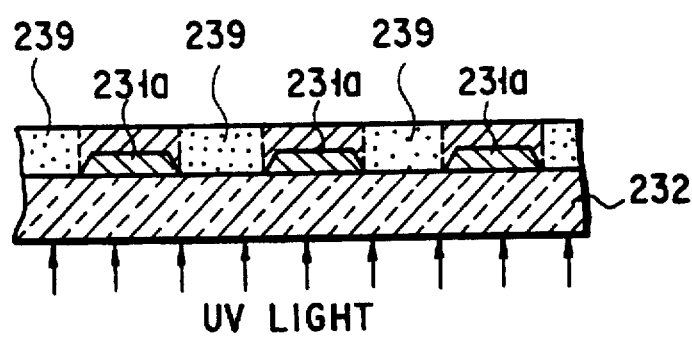
Figure 9C:
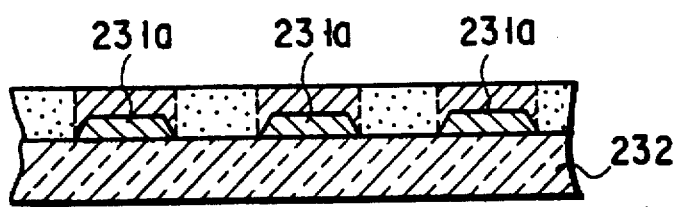
Figure 9D:
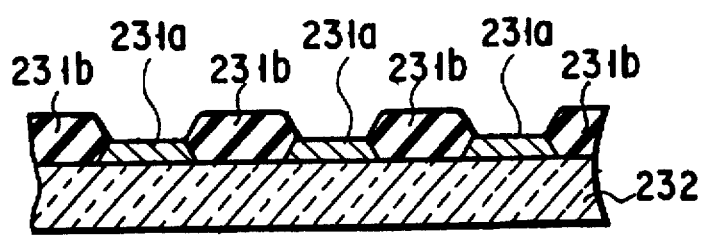

The structure shown in FIG. 6 is prepared in the following manner. Polysilane resist is applied onto an array substrate 232 as shown in FIG. 9A, and is exposed with ultraviolet light from the back surface of the array substrate 232, to form a latent image 239. In the next the substrate is dipped into an insulating dipping solution, and is subjected to baking as shown in FIG. 9C, thereby to vitrify the gap 231b of a conductive portion 231a. Thereafter, as shown in FIG. 9D, polysilane resist is removed by a solvent washing step.

Figure 10A:
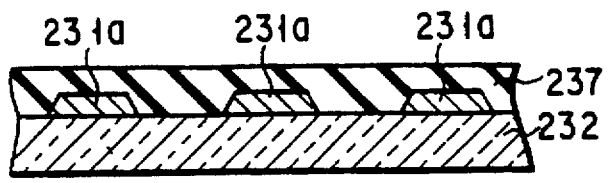
FIGS. 10A to 10E are cross sections showing a step of preparing the pad portion shown in FIG. 7.
Figure 10B:
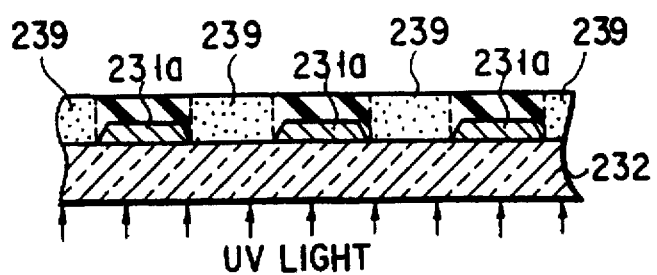
Figure 10C:
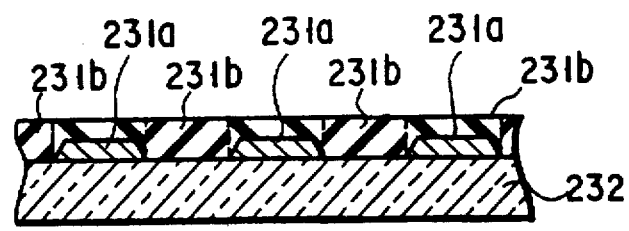
Figure 10D:
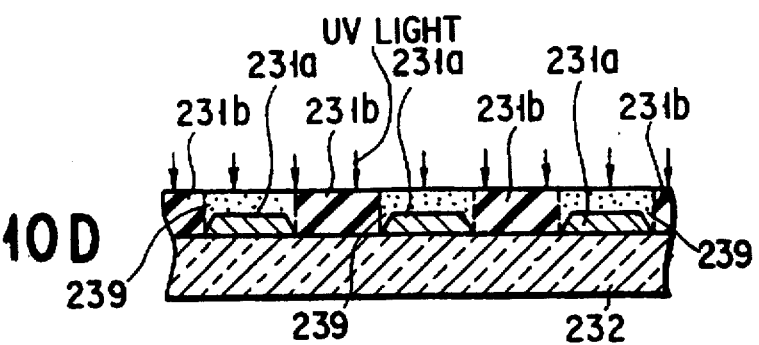
Figure 10E:
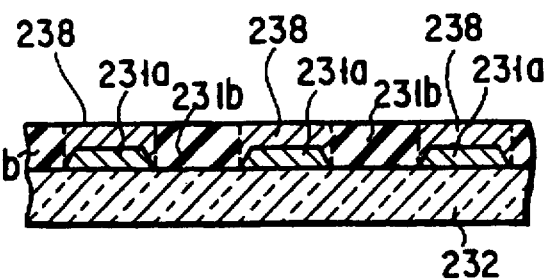

The structure shown in FIG. 7 is prepared in the following manner. As shown in FIG. 10A, polysilane resist 237 is applied onto the array substrate 232, and ultraviolet light is irradiated from the back surface of the array substrate 232, thereby to form a latent image 239 through exposure. In the next, the substrate is dipped into an insulating dipping solution, and as shown in FIG. 10C, this substrate is subjected to baking, thereby to vitrify the gap 231b of a conductive portion 231a. Subsequently, as shown in FIG. 10D, ultraviolet light is irradiated from the surface of the glass substrate 232, thereby to form a latent image 239 through exposure. Next, as shown in FIG. 10E, the substrate is dipped into a conductive dipping solution, and is subjected to baking, thereby to form conductive organic-inorganic hybrid glass 238. Formation of a pad portion as described above may be performed by an independent step. However, it is preferable to simultaneously perform in the step of forming a functional layer.

The first invention of the present invention is characterized in that a functional layer is provided on a switching element, and a pixel portion of the functional layer is formed of conductive organic-inorganic hybrid glass.

In the first invention, a pixel electrode electrically connected to the switching element may consist of a color pixel electrode which serves as both of a pixel electrode formed of organic-inorganic hybrid glass and a color filter. Specifically, the pixel electrode may have a conductivity property and a coloring characteristic as characteristics of a pixel portion of the functional layer. As a result of this, an ITO film need not newly be formed on the functional layer. In addition, the problem of variation in ITO film quality for every color filter color and the problem of side-etching can be solved.

In the first invention, formation of the functional layer is performed in the following manner. TFTs are formed on a substrate, and resist is applied thereon. Subsequently, ultraviolet light is selectively irradiated to form a latent image in pixel portions. Next, the TFT substrate is dipped into a dipping solution containing at least one of In and Sn complexes. Subsequently, the TFT substrate is heated to selectively vitrify the pixel portions.

In this method, oxides of In and Sn are taken in by the pixel portions, which are thereby rendered conductive. Color pixel electrodes can be prepared by introducing coloring material into the dipping solution.

In addition, it is effective to adopt a method as follows. Specifically, a latent image is formed, by UV-light irradiation with use of TFTs having pixel electrodes, and thereafter, the TFTs are brought into an on-state while being dipped in a electrochemical deposition solution containing In and Sn, thereby to apply a voltage to signal lines, so that a voltage is applied to pixel electrodes. Thereafter, these are heated to vitrify the pixel portions. In this method, a dipping solution rapidly soaks in only those portions where a latent image is formed and a voltage is applied. Therefore, it is possible to select a pixel to which the dipping solution soaks, by selecting a TFT to be applied with a voltage. In addition, it is possible to greatly reduce the time required for processing steps.

The second invention of the present invention is characterized in that a pixel electrode is provided on the functional layer, that the pixel portions of the functional layer is formed of insulating organic-inorganic hybrid glass, and that a connecting portion between a pixel electrode and a switching element is formed of conductive organic-inorganic hybrid glass or conductive polymers.

In the second invention, it is especially effective if the material of inorganic glass of organic-inorganic hybrid glass as electric contact material between a pixel electrode and a TFT is $In_2O_3$ doped with 5 weight % $SnO_2$. In particular, it is desirable to use material having a composition similar to the material of a pixel electrode as electric contact material, for the purpose of attaining an ohmic contact.

In addition, conductive fine grains may be dispersed in the contact portion. The conductive fine grains mean conductive powder of a sub-micron size. As the material of the powder, carbon, silver, gold, or the like may be used. The content amount of conductive fine grains in the hybrid glass should preferably be 3 to 40 weight %. Further, to reduce light leakage from the TFT, it is effective to add black fine grains, e.g., titanium oxide $(Ti_nO_{2n-1})$ and nitrogen doped titanium oxide $(Ti_nO_{2n-1})$.

Further, it is also effective that a conductive polymer is used as material of the electric contact between a pixel electrode and a TFT. Here, as the conductive polymer, it is possible to use polypyrrole, polythiophene, poly(3-methylthiophene), and polyisonaphtothiophene, and these materials doped with anion, as black conductive polymers, and to use polyisothianaphthene, polyacenaphthene, and the like, as transparent conductive polymers (Table 1).

In the second invention, the functional layer is formed in the following manner. TFTs are formed on a substrate, and resist is applied thereonto. Subsequently, ultraviolet light is irradiated to electric contact portions between the TFTs and the pixel electrodes to be formed in a post step. In the next, the TFT substrate is dipped in a dipping solution (which may contain conductive fine grains) containing at least one of the In and Sn complexes. Subsequently, the TFT substrate is heated to selectively vitrify the contact portions. At last, pixel electrodes are formed on organic-inorganic hybrid glass.

In this method, oxides (and conductive fine grains where appropriate) of In and Sn are taken into the electric contact portions between the TFTs and the pixel electrodes, thereby making these portions conductive.

Further, in the second invention, an electrochemical deposition method similar to that of the first invention may be used. In this case, a latent image is formed by selectively forming contact portions, and thereafter, the electrochemical deposition step is carried out.

In addition, in the second invention, as a method of contact the pixel electrodes and the TFTs, it is possible to adopt a method of applying resist onto an array substrate, pealing resist in the electric contact portions between the pixel electrodes and the TFTs in the array substrate, and driving the TFTs while dipping the array substrate into the electrolytic solution containing monomers for forming conductive polymers, thereby to form conductive polymers. In this method, an oxidation-reduction reaction selectively proceeds at through-hole portions, so that the through-hole portions are fulfilled with conductive polymers. In the method described above, as a method of pealing resist to form a through-hole, there are methods such as a RIE method and a method of performing exposure with use of ultraviolet light having a wavelength shorter than 280 nm and of making the exposed portions dissolved in a development solution, thereafter.

In addition, monomers for forming conductive polymers are raw material which are to form conductive polymers by electrolytic polymerization and which form polypyrrole, polythiophene, poly(3-methylthiophene), polyisonaphtothiophene, polyisothianaphthene, and polyacenaphthene by electrolytic polymerization. Specifically, corresponding monomers are respectively pyrrole, thiophene, 3-methylthiophene, isonaphtothiophene, isothianaphthene, and acenaphthene (Table 1).

TABLE 1

| CONDUCTIVE POLYMER AND CORRESPONDING MONOMER | | |
|---|---|---|
| CONDUCTIVE POLYMER | CORRESPONDING MONOMER | COLOR |
| POLYPYRROLE | PYRROLE | BLACK |
| POLYTHIOPHEN | THIOPHEN | BLACK |
| POLY(3-METHYLTHIOPHEN) | 3-METHYLTHIO-PHEN | BLACK |
| POLYISONAPHTHO-THIOPHEN | ISONAPHTHO-THIOPHEN | BLACK |
| POLYISOTHIANAPHTHENE | ISOTHIANAPHTH-ENE | TRANSPARENT |
| POLYACENAPHTHENE | ACENAPHTHENE | TRANSPARENT |

As an electrolytic solution, it is effective to use water, acetonitrile, or a mixed solution thereof as a solvent, and to use lithium chloride, tetrabutyl ammonium chloride and the like as an electrolyte. Note that electrolytic polymerization means that electrodes are inserted in a solution containing an electrolyte and a monomer which forms a conductive polymer, and a voltage is applied to the electrodes, thereby to proceed a reaction of monomer→polymer and a polymerization reaction through an oxidation reduction reaction of a monomer.

The third invention of the present invention is characterized in that a functional layer is formed between a storage capacity line and a pixel electrode, that the portion inserted between the storage capacity line and the pixel electrode is formed of insulating organic-inorganic hybrid glass, and that the organic-inorganic hybrid glass functions as an insulating film for a capacitor of the storage capacity.

In the third invention, organic-inorganic hybrid glass functions as an insulating member for a storage capacity line. In this case, the capacitor portion may be formed as an opening portion, or a non-opening portion may be formed as a capacitor. When the capacitor is formed as an opening portion, the large part of the capacitor is formed of a transparent electrode. In addition, it is effective that a part of the electrode is made of metal in order to prevent flickering and to ensure a sufficient conductivity. (See FIGS. 30 to 32 which will be described later.)

In the third embodiment, the thickness of the color filter layer is set to 2.0±1.0 μm, the dielectric constant of the color filter layer is set within a range of 4.0±1.0, and the inter-pixel dielectric constant difference should preferably be within a range of ±0.1. Fine adjustment of the dielectric constant is achieved by adjusting the dielectric constant of the inorganic glass portion. This is performed by changing the composition of the metal oxide. Specifically, the fine adjustment is performed by changing the rate of raw material which will form a desired metal oxide. In case where a non-opening portion is used as a capacitor, it is effective that the lower electrode is made of the same material as the gate line, and is formed at the same time when the gate line is formed, in view of reducing the number of process. In this case, the thickness of the color filter layer should preferably be 1.5 μm or less. Further, by mixing $BaTiO_3$, $PbTiO_3$, $KTaO_3$, $Ta_2O_5$, and $TiO_x$ into inorganic glass, the dielectric constant can effectively be increased and the area of the capacitor can also be effectively be decreased.

In the third embodiment, organic-inorganic hybrid glass may be used as a gate insulating film of a switching element. When the organic-inorganic hybrid glass is used as described, it is desirable that the portion of the layer is prepared as non-colored transparent organic-inorganic hybrid glass, without executing dyeing process, in view of ensuring an insulating characteristic. In addition, in order to obtain an excellent element characteristic, the thickness of the layer should be 0.4±0.2 μm. The composition thereof contains $SiO_2$ as a main component, and the content amount thereof should preferably be 50 volume % or more.

In this invention, when organic-inorganic hybrid glass is used as an insulating film for a capacitor constituting the Cs, the volume specific resistance thereof should preferably be set to $10^{16}$ Ω·cm or more. Likewise, when organic-inorganic hybrid glass is used as a gate insulating film for a transistor of the TFT, the volume specific resistance should preferably be set to $10^{18}$ Ω·cm or more. In addition, the BM portion of the functional layer should preferably have an insulating characteristic of $10^{14}$ Ω·cm or more. The pixel regions of the functional layer may have an insulating characteristic of $10^{13}$ Ω·cm or more, or may have a conductivity property of $10^{10}$ Ω·cm or less. If the pixel portion of the functional layer is made conductive, it may be used also as a pixel electrode.

The fourth invention of the present invention is characterized in that a functional layer is formed on a switching element, that an insulating film is formed on the functional layer, that a pixel electrode is formed on the insulating film, and that the pixel portion in the functional layer is formed of insulating organic-inorganic hybrid glass.

In the fourth invention, taking into consideration smoothing of the influences onto the ITO electrodes from the backing color filter layer, the film thickness of an insulating film should preferably be 10 nm or more. In addition, $SiO_2$, SiNx, AlOx, and TaOx are cited as material of the insulating film. The film forming method thereof is not limited to a plasma CVD method, but any methods can be used. However, in order to prevent degradation in the TFT characteristic, the substrate temperature when forming the film should preferably set to be lower than the a-Si film forming temperature.

In the fourth invention, it is possible to prevent the functional layer from making bad influences on the ITO film and to also prevent influences from expansion of the surface of the functional layer, by forming a protect film made of an insulating film on the functional layer. In this case, the roughness of the functional layer as a backing layer, by setting the film thickness of the insulating film to be 10 nm or more. In this manner, the problem of side-etching which occurs when etching the ITO film can be prevented.

In the following, embodiments of the present invention will be specifically explained, with reference to the drawings. The present invention is not limited only to those embodiments, but can be changed and modified in practical use within the scope of the subject matter of the invention.

Embodiment 1

According to Embodiment 1, there is provided a substrate for a display device, a pixel portion of which is made of organic-inorganic hybrid glass having a conductive property.

An example of the substrate for the display device, according to Embodiment 1, will now be described.
(Example 1-1)
FIG. 11E is a cross sectional view of a substrate for a display device, according to Embodiment 1 of the present invention. The substrate (array substrate) shown in FIG. 11E can be made from an array substrate having an ITO pixel electrode, conventionally used in a display device.

A TFT array substrate having the above-described structure is manufactured by the following steps. An MoTa alloy layer having a thickness of 300 nm is formed on a glass substrate 120, and then patterned to form a gate line 128, an address line (not shown) (scanning line), and Cs (capacitance lines) 122a to 122c at the same time. Subsequently, a silicon oxide film (gate insulating layer) 123 having a thickness of 400 nm is formed on the formed members by plasma CVD. Then, a-Si active layer 129 having a thickness of 100 nm is formed and patterned. Further, an SiNx i-stopper film 130 having a thickness of 50 nm is formed thereon, followed by patterning. Furthermore, n+a-Si layers 121a and 121b having a thickness of 50 nm are formed on the a-Si active layer 129 and the SiNx i-stopper film 130, followed by patterning.

Next, ITO is sputtered to have a thickness of 150 nm on the portions of the silicon oxide film 123, which are situated above the Cs lines 122a to 122c, and then patterned, to form a transparent electrode 124 for Cs and electrochemical deposition. Subsequently, a predetermined metal such as Al is sputtered, followed by patterning, so as to form a drain electrode 131, a source electrode 132 and data lines at the same time.

The method of manufacturing the array substrate shown in FIG. 11E will now be described. First, as shown in FIG.

Figure 11A:
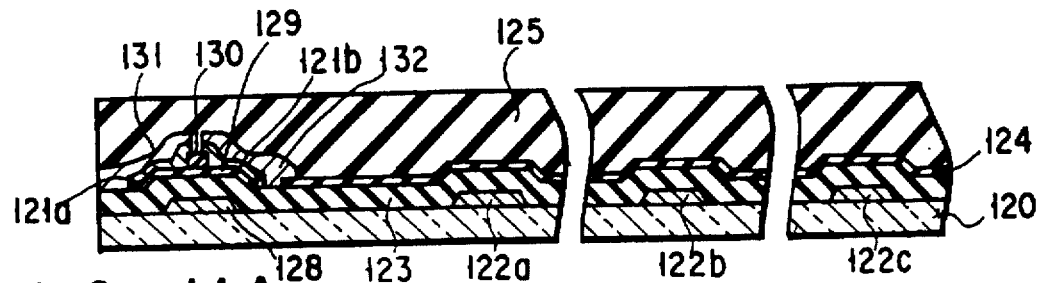
FIGS. 11A to 11E are cross-sections for explaining a method of manufacturing the substrate for a display device according to Embodiment 1.
Figure 11B:
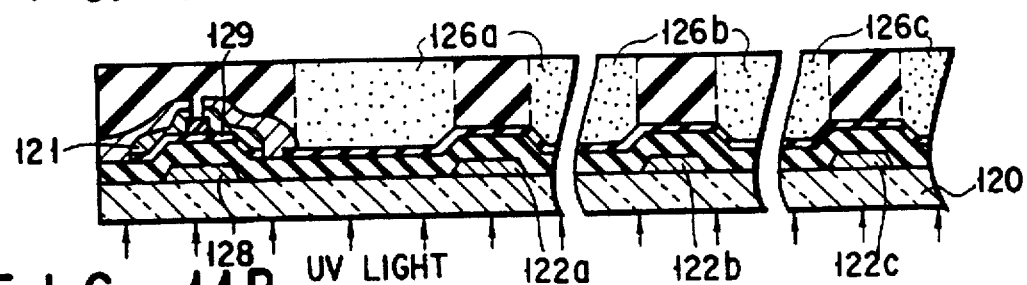
Figure 11C:
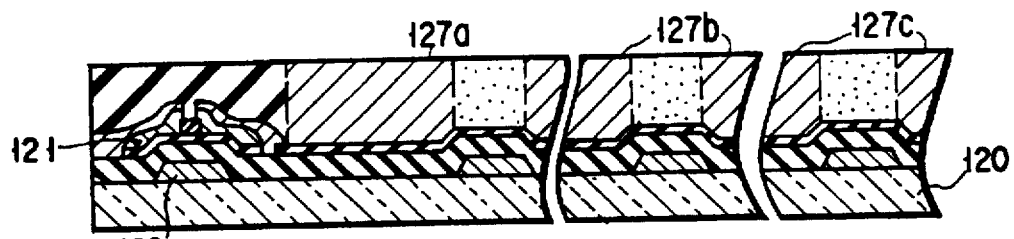

11A, a 5 weight % toluene solution of methylphenylpolysilane expressed by formula 4, is applied on a TFT array substrate to have a thickness of 2.0 μm by spin-coating, and then as shown in FIG. 11B, the array substrate is exposed entirely from its back surface with deep-UV light (300 to 340 nm). By this back surface exposure process, latent images 126a to 126c are formed in an opening portion (the portion other than the signal lines and the gate line the TFT). Next, the TFT array is dipped into an electrochemical deposition solution having the composition described below. While maintaining this state, the R pixels are all driven so as to color the region in which a latent image is formed, in R, thus obtaining an R-coloring portion 127a. During this operation, with use of an SCE (saturated calomel electrode) as a common electrode, a voltage of +5V is applied to the signal lines while applying +20V to the gate. After that, as shown in FIG. 11C, the TFT array substrate is rinsed with pure water. In a manner similar to that described above, a G-coloring portion 127b and a B-coloring portion 127c are formed by the electrochemical deposition process. Subsequently, these color portions are baked on a hot plate at 100° C. for 10 minutes. After the baking, the R, G and B coloring portions 127a to 127c exhibit respectively colors of R, G and B, and they have a conductive property.

| (Composition of an electrochemical deposition solution for R, G, and B coloring (conductive)) | |
| --- | --- |
| indium acetylacetovate (In(COCH$_2$COCH$_3$) | 20 ml |
| tinacetylacetonate (SnCCOCH$_2$COCH$_3$) | 1 ml |
| pigment fine grains (average grain diameter 0.1 μm) (R: anthraquinone based, G: copperphthalocyanine based, B: copperchlorophthalocyanine based) | 1.0 g |
| ampliphilic PEG type interface activation ferrocene (FPEG) (Formula 1) | 0.2 g |
| LiBr | 1.3 g |
| acetonitrile | 15 ml |
| water | 135 ml |

Figure 11D:
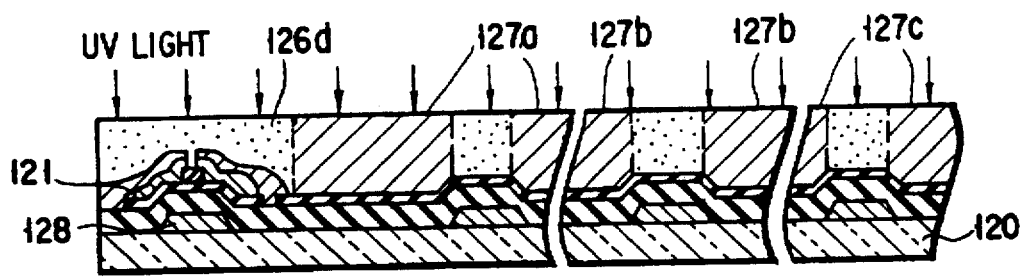
Figure 11E:
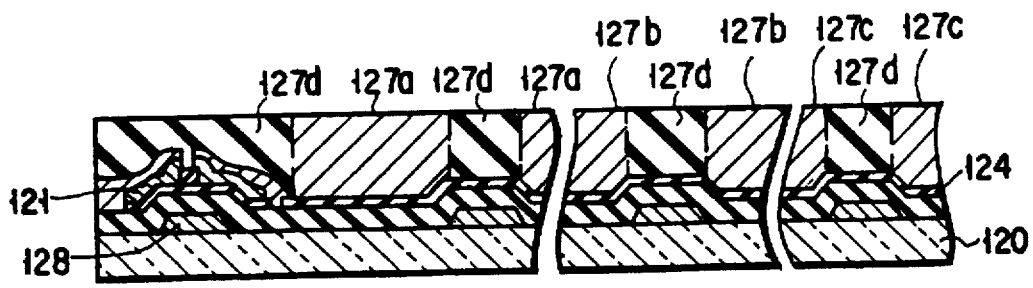

Next, as shown in FIG. 11D, the entire surface of the TFT array substrate is exposed to form a latent image 126d, and the substrate is dipped into a black sol-gel liquid having the composition described below, thus forming a black matrix portion 127d. Subsequently, the substrate is rinsed with pure water, and then post-baked at 250° C. for 60 minutes. After the baking the black matrix portion 127d exhibits block color and has an insulating property.

| (Composition of a black sol-gel solution (insulating) pigment (average grain diameter 0.3 μm | |
| --- | --- |
| a mixture of R pigment, G pigment, B pigment, cyan pigment, violet pigment, and yellow pigment | 5 g |
| methanol (CH$_3$OH) | 30 ml |
| tetraethoxysirane (Si(OC$_2$H$_5$)$_4$) | 20 ml |
| water | 85 ml |
| hydrochloric acid (HCl) | 0.25 ml |
| acetonitrile | 8 ml |

Meanwhile, in the opposite substrate side, ITO is sputtered on the opposite substrate so as to form a common electrode. This opposite substrate and the above-described TFT array are arranged face to face, thus assembling a cell, and a liquid crystal material is injected into this cell, thus completing a liquid crystal display device.

In Example 1-1, a conductivity property is imparted in the color filter made of the organic-inorganic hybrid glass, and a color pixel electrode is manufactured to have such a feature. In this manufacturing method, sputtering of ITO, patterning or etching step is not necessary after formation of a color filter. Therefore, the problem of side-etch created when an ITO film is formed on the color filter, does not occur.

According to Example 1-1, organic-inorganic hybrid glass having a conductivity property can be formed by only adding metal complexes as a raw material of a conductive oxide to components of the dipping solution used for coloring polysilane. Here, the components of the dipping solution for coloring and applying a conductivity property are not limited to In(AcAc)$_3$ and Sn(AcAc)$_2$, but may be any kinds metal complexes as long as the metal complexes are those metal complexes, e.g., Sn(OEt)$_2$, Sn(OMe)$_2$ and the likes, which are generally used for forming ITO according to a sol/gel method. In addition, the composition of the dipping solution generally has a ratio of In(AcAc)$_3$:Sn(AcAc)$_2$_95:5 (atom %). However, this composition ratio may be changed to another ratio, as long as the transmittance and conductivity property are satisfied.

In the method discussed in Example 1-1, a color filter-on array substrate can be formed completely by self-alignment without having a mask exposure step in the color filter forming step. Consequently, a margin for aligning a mask is not necessary, and therefore color filter-on array substrate having a high aperture rate can be provided.

(Example 1-2)

FIG. 2 is a cross-section of an array substrate of a liquid crystal display device according to Embodiment 1 of the present invention. In Example 1-2, a color filter made from polysilane functions as a pixel electrode. In the figure, reference 11 denotes a glass substrate. On the glass substrate 11, a gate electrode 12 is formed and a silicon oxide film 13 is formed. On the silicon oxide film 13, an island-like a-Si active layer 14 is formed. A groove is provided in and separates the a-Si active layer 14. In addition, source electrode (16b) and drain electrode (16a) are respectively formed on the separated a-Si active layers 14 with n$^+$a-Si contact layers 15a and 15b inserted therebetween. A SiNx film 17 is formed on the source and drain electrodes 16b and 16a. This SiNx film 17 is also provided in the separation groove. A black matrix portion 18d made of organic-inorganic hybrid glass is formed on the SiNx film 17.

Meanwhile, storage capacity line (Cs line) 19a are formed on the glass substrate 11. A contact electrode 112 are formed on the Cs line 19a, with a silicon oxide film 13 inserted therebetween. Further, an SiNx film 17 and a functional layer 18 made from polysilane are formed on the contact electrode. A contact hole 112 which reach the contact electrode 112 is formed above the storage capacity lines 19a. A TFT array substrate is thus constituted.

The liquid crystal display device having the above structure can be manufactured in the following manner.

At first, Mo—Ta alloy is sputtered with a thickness of 300 nm and is subjected to patterning, thereby to simultaneously form a gate electrode 12, an address line (or scanning line) not shown, and a Cs line (or capacity line) 19.

In the next, a silicon oxide film 13 is formed with a thickness of 350 nm by a plasma CVD method, and an a-Si layer is formed thereon to have a thickness of 300 nm. Further, n$^+$a-Si layer is formed thereon, in this order. Subsequently, the a-Si layer and n$^+$a-Si layer are subjected to patterning to form an island-like a-Si active layer 14 and n$^+$a-Si contact layers 15a and 15b are formed. In this state, the n$^+$a-Si contact layers 15a and 15b are separated from each other by performing dry etching, e.g., RIE (reactive ion etching) after source and drain electrodes are formed.

Subsequently, the SiOx film 17 at the contact portion is etched with use of dilute HF, to form contact holes for leading gate and signal lines. Next, an Al film is formed by sputtering on the resultant structure, and are subjected to patterning, to simultaneously form source and drain electrodes 16a and 16b, a data wiring (or signal line) not shown, and contact portion electrode 112'. Thereafter, an SiNx film 17 is formed with a thickness of 300 nm by plasma CVD on the resultant structure and an SiNx film of the contact portion 111, 112 is dry etched to form x contact holes.

In the next, polysilane is coated on the SiNx film 17 by spin-coating or the like, and is formed a polysilane film with a thickness of 1 μm. A parcel portion of the polysilane film is selectively exposed with ultraviolet light, to form a latent image of a pixel pattern. After the latent image is formed, the substrate is dipped in a dipping solution (sol solution) containing a pigment, and $In(AcAc)_3$ and $Sn(AcAc)_2$, thereby to subject the polysilane film to pattern, and thereafter, the exposed portion is vitrificated by heating and prebaking. ITO formed by oxidation of $In(AcAc)_3$ and $Sn(AcAc)_2$ is incorporated in the pixel portion with the pigment.

The above exposure and dipping are repeated three times for each of R, G, and B, thereby to form a conductive color filter layer 18a. The conductive color filter is connected with a drain electrode 16b of the TFT by a contact hole 111, thereby to form a pixel electrode. Specifically, a color pixel electrode which serve as both of a color filter and a pixel electrode is constituted.

In the next, the entire surface is exposed to light, and thereafter, the array substrate is dipped in a carbon black sol. The resultant is postbaked at 250° C. for about 60 minutes, to perform coloring of the black matrix portion 18d. Thus, a color filter and a black matrix are prepared. Conductivity is not applied to the black matrix. On the other hand, ITO is sputtered on the opposing substrate to form a common electrode. The opposing substrate and the TFT array substrate are arranged opposite to each other, to form a cell. Liquid crystal material is injected into the cell, to complete a liquid crystal display device.

In this Example 1-2, since the pixel portion of the color filter made from polysilane is made conductive, steps of sputtering, patterning, and etching of ITO need not be performed after formation of the color filter. Therefore, two problems as described above which occur when an ITO film is formed on the color filter do not occur at all.

According to Example 1-2, a color filter having a conductivity property can be formed by only adding metal complexes to components of the dipping solution used for coloring polysilane. Here, the components of the dipping solution for coloring and applying a conductivity property are not limited to $In(AcAc)_3$ and $Sn(AcAc)_2$, but may be any kinds metal complexes as long as the metal complexes are those metal complexes, e.g., $Sn(OEt)_2$, $Sn(OMe)_2$ and the likes, which are generally used for forming ITO according to a sol/gel method. In addition, the composition of the dipping solution generally has a ratio of $In(AcAc)3:Sn(AcAc)2= 95:5$(atomic %). However, this composition ratio may be changed to another ratio, as long as the transmittance and conductivity property are satisfied.

(Example 2)

Figure 12:
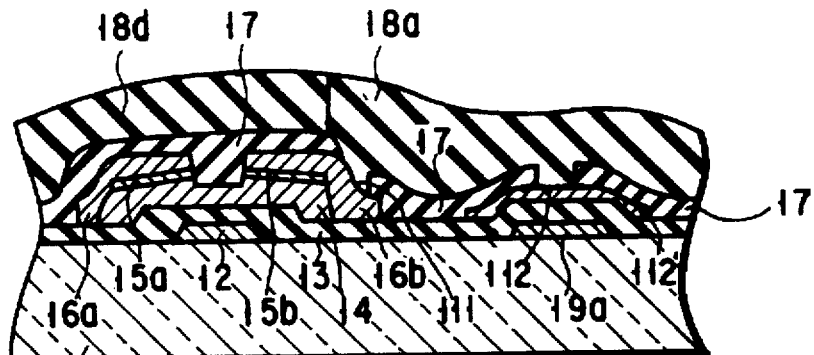
FIGS. 12 and 13 are cross-sections showing the substrate for a display device according to the present invention.
Figure 13:
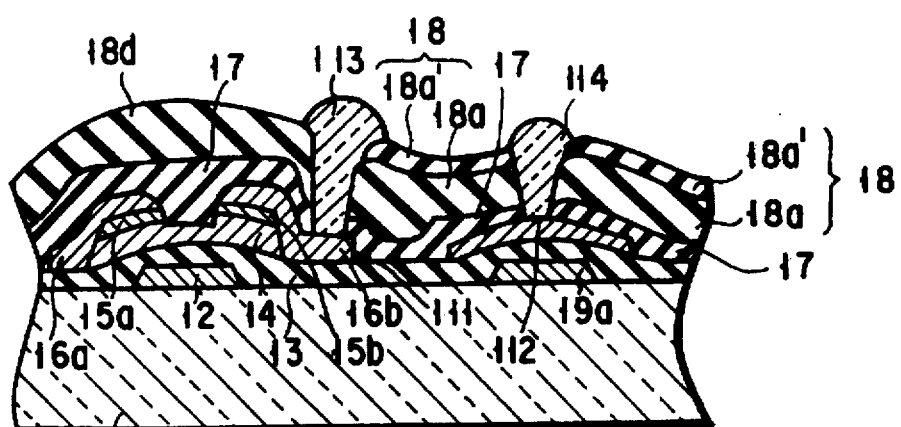

FIG. 13 is a cross-section of an array substrate of the liquid crystal display device according to Embodiment 1 of the present invention. Note that the same portions as those of FIG. 12 are denoted by the same references as used in FIG. 12, and detailed explanation thereof will be omitted herefrom. In Example 2, explanation will be made to a structure in which the color filter made from polysilane includes a conductive portion and a non-conductive portion.

The array substrate having the structure as described above can be manufactured in the following manner, the steps to be performed until the TFT is formed are the same as those of Example 1-2, and explanation thereof will be omitted herefrom. On the array substrate 11 on which TFT is formed, an SiNx film 17 is formed with a thickness of 300 nm. Polysilane is coated thereon by spin-coating or the like, and is dried to form a polysilane film with a thickness of 1.2 μm. In the next, the SiNx film 17 and the polysilane film are subjected to dry-etching to form contact holes.

Subsequently, the polysilane film is selectively exposed to ultraviolet light, to form a latent image of coloring pattern, and the array substrate is dipped in a dipping solution containing a basic dye (i.e., first dipping), to perform pattern dyeing. Thereafter, in order to apply a conductivity property, the array substrate is dipped in a dipping solution containing $In(AcAc)_3$ and $Sn(AcAc)_2$ (i.e., second dipping). Thereafter, the resultant is heated and prebaked to vitrificated the exposed portion. The above exposure, first dipping, second dipping, and heating/drying are repeated three times for each of R, G, and B, thereby to form color pixel electrode 18. Since the dipping process is divided into two steps of first dipping for dying and second dipping for applying a conductivity property and is thus performed two times, the surface portion 18a' is made conductive while the inner film portion 18a is only dyed but is not conductive. In this case, the film thickness of the conductive portion 18a' can be controlled by the dipping time period of the second dipping step.

In the next, the entire surface of the array substrate having the color pixel electrode 18 is exposed to light, and thereafter, the substrate is dipped in a carbon black sol. The resultant is postbacked at 250° C. for about 60 minutes, to perform dyeing of the black matrix portion 18d. Thus, a black matrix 18d and a color pixel electrode 18 are prepared.

Figure 14:
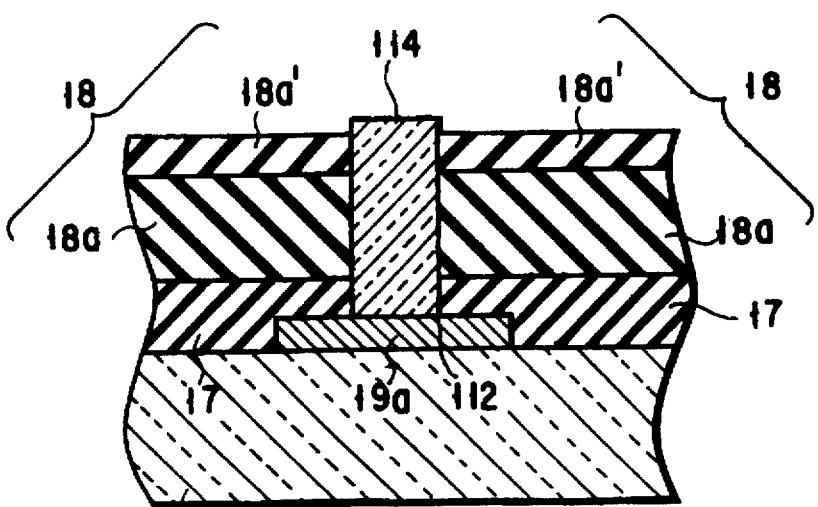
FIG. 14 is a cross-section showing a contact portion in the substrate for a display device shown in FIG. 13.

Subsequently, contact portions 111 and 112 are filled with a conductive polymer, and via holes 113 and 114 are formed to make electric connections between the drain electrode 16b and the conductive portion 18a' of the color pixel electrode and between the capacity electrode 112 and the conductive portion 18a' of the color pixel electrode. These via holes 113 and 114 may be formed to be slightly higher than the depth of the contact holes before exposure and dipping of polysilane. In this case, as shown in FIG. 14, a contact is attained between the side surface of the conductive polymer and ITO prepared by the sol/gel method. In FIG. 14, after the contact holes are formed, a via hole 114 is prepared and ITO 18a' is formed, thereby making a contact between the via hole 114 and the side surface of the ITO 18a'. As a result of this, the electric potential of the pixel 19a of the contact portion becomes equal to the pixel potential.

Meanwhile, ITO is sputtered on the opposing substrate, to form a common electrode. The opposing substrate and the TFT array substrate are arranged opposite to each other, thereby to constituting a cell. Liquid crystal material is injected into this cell to complete a liquid crystal display device.

As described above, with the substrate for the display device, according to Embodiment 1, the decrease in the effective voltage applied to the liquid crystal, caused by the voltage distributed to the color filter, is avoided, thereby making it possible to solve the problem of the increase in the driving voltage. Further, it is not necessary to form a pixel electrode separately, the problem of side-etch or the like will not occur, and the number of steps in the manufacturing process can be reduced.

Embodiment 2

Embodiment 2 is designed to solve the problem of a contact error between the source electrode of the switching element and the pixel electrode in the pixel electrode upright structure, and provides a substrate for a display device, including a function layer having a contact portion made of organic-inorganic hybrid glass or conductive polymer.

Example of substrate for a display device of Embodiment 2 may be illustrated by the following description.

(Example 3)

FIG. 15 is a cross-section of a substrate (or array substrate) for a display device according to Embodiment 2. In the figure, the reference 401 denotes a glass substrate. A gate line 402 and a Cs line 403 are formed on the glass substrate 401, and a silicon oxide film 404 is formed thereon. On the silicon oxide film 404, an a-Si active layer 406 is formed by patterning, and an SiNx i-stopper film 407 is formed on a part of the a-Si active layer 406. Further, n+a-Si layers 408a and 408b are formed, separated from each other, on the a-Si active layer 406 and the SiNx stopper film 407. Further, source and drain electrodes 409 and 410 are formed on the n+a-Si layers 408a and 408b, such that the electrodes cover an end portion of the a-Si active layer 406.

On the TFT and Cs line thus formed, functional layers 413, 411a, 411b, and 414 made of organic-inorganic hybrid glass are formed. These functional layers include R, G, and B regions 413 having an insulating property, a contact region 411 for electrically connecting a pixel electrode 412 provided on the functional layer with the source electrode 409, a black matrix region 414 having insulating property, and a Cs electrode portion 411b above having conductivity property.

The TFT array substrate constituted in the above structure can be manufactured in the following manner. At first, MoTa alloy is sputtered with a thickness of 300 nm on the glass substrate 401 and is subjected to patterning, thereby to simultaneously form a gate line 402, an address line (not shown), and a Cs line 403. Subsequently, a silicon oxide film (or gate insulating film) 404 having a thickness of 400 nm is formed thereon by plasma CVD, and an a-Si active layer 406 having a thickness of 100 nm is formed and are subjected to patterning. Further, an SiNx-i stopper film 407 having a thickness of 50 nm is formed thereon and is subjected to pattering. Further, an n+a-Si layers 408a and 408b having a thickness of 50 nm are formed on the a-Si active layer 406 and SiNx stopper film 407, and are subjected to patterning. Next, predetermined wiring metal such as Al or the like is sputtered and is subjected to patterning, thereby to simultaneously form a source electrode 409, a drain electrode 410, and a data line (not shown).

Subsequently, as shown in FIG. 16A, a 5 weight % toluene solution 415 of methylenephenylpolysilane expressed in the formula 4 described before is coated with a film thickness of 2.0 µm by spin-coating, and the R-pixel portion 413 of the pixel electrode is exposed with deep-UV light (280 to 320 nm) through a photo mask 416, to form a latent image 417 as shown in FIG. 16B. In the next, the TFT array substrate is dipped in a red sol-gel solution having the following composition, and is thereafter rinsed with pure water. Further, the resultant is subjected to baking at 100° C. for 10 minutes. In this manner, as shown in FIG. 16C, an R-colored portion 413 is formed. As in the same manner as above, G-colored and B-colored portions are formed. After baking, the R-, G-, and B-colored portions 413 are respectively colored in red, green and blue, and have an insulating property.

| (Composition of a black sol-gel solution for R, B, and B) | |
|---|---|
| pigment (average grain diameter 0.1 µm) (different between R, G, and B) | 0.5 to 1.5 g |
| methanol (CH₃OH) | 30 ml |
| tetraethoxysirane (Si(OC₂H₅)₄) | 20 ml |
| water | 85 ml |
| hydrochloric acid (HCl) | 0.25 ml |
| acetonitrile | 8 ml |

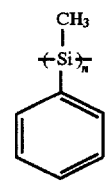

Formula 4

(n is integer, preferably n≧50)

Figure 16D:
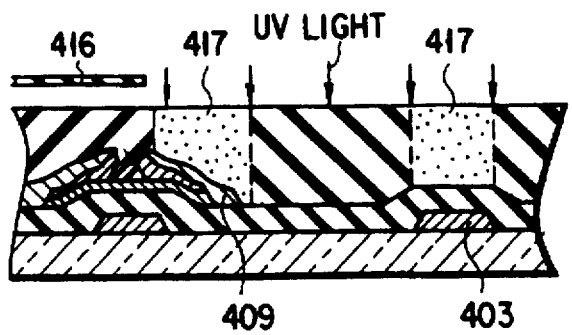

In the next, as shown in FIG. 16D, a mask 416 by which the signal line is covered and the Cs line 4116 and the contact portion 411a are opened is used to perform exposure with use of deep-UV. In this manner, a latent image 417 is formed on polysilane resist above the Cs line 403 and the source electrode 409 (while the R, G, and B portions 413 have already been vitrified and therefore are not changed by light).

Figure 16E:
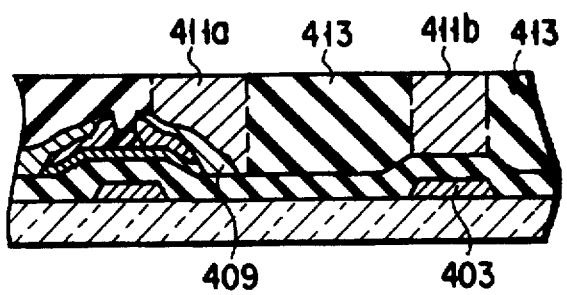

Subsequently, as shown in FIG. 16E, the TFT array substrate is dipped in a black sol-gel solution having the following composition, and thereafter, is rinsed with pure water. Further, the substrate is subjected to pre-baking at 100° C. for 10 minutes. After baking, the portions 411a and 411b are black and have conductivity property.

| (Composition of a metal complex black sol-gel solution (conductive)) | |
|---|---|
| carbonblack fine grains (average grain diameter 0.3 µm) | 5 g |
| methanol (CH₃OH) | 30 ml |
| indiumacetylacetonate (In(COCH₂COCH₃)) | 20 ml |
| tinacetylacetonate (Sn(COCH₂COCH₃)) | 1 ml |
| water | 85 ml |
| hydrochloric acid (HCl) | 0.25 ml |
| acetonitrile | 8 ml |

Figure 16F:
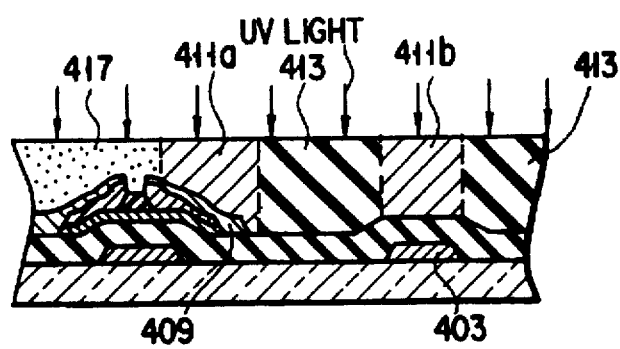
Figure 16G:
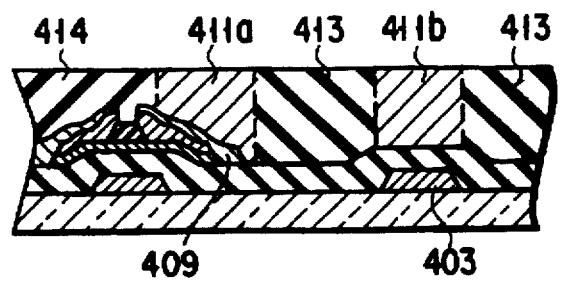

In the next, as shown in FIG. 16F, the entire surface of the TFT array substrate is exposed to light, to form a latent image 417, and is then dipped in a black sol-gel solution having the following composition, as shown in FIG. 16G, to form a black matrix portion 414. Subsequently, this is subjected to post-baking at 250° C. for 60 minutes. After the baking, the black matrix portion 414 is black and has an insulating property.

| (Composition of a black sol-gel solution (insulating)) pigment (average grain diameter 0.3 µm, | |
|---|---|
| a mixture of R pigment, G pigment, B pigment, cyan pigment, violet pigment, and yellow pigment) | 5 g |
| methanol (CH₃OH) | 30 ml |
| tetraethoyxilane (Si(OC₂H₅)₄) | 20 ml |
| water | 85 ml |

| | |
|---|---|
| hydrochloric acid (HCl) | 0.25 ml |
| acetonitrile | 8 ml |

Figure 16H:
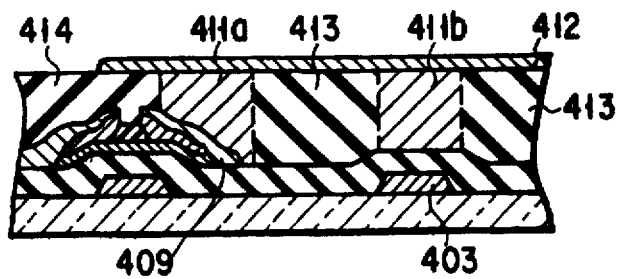

At last, as shown in FIG. 16H, ITO is sputtered with a thickness of 150 nm on the functional layer, and is subjected to patterning, to form a pixel electrode 412.

Meanwhile, ITO is sputtered on the opposing substrate, to form a common electrode. This opposing substrate and the TFT array substrate are arranged opposite to each other, to constitute a cell, and liquid crystal material is injected into the cell, to complete a liquid crystal display device.

Since the liquid crystal display device thus manufactured has a functional layer (e.g., a contact portion, R, G, and B portions, and a BM portion) is made of organic-inorganic hybrid glass, and since the contact portion between the pixel electrode 412 and the drain electrode 409 is made of a metal oxide semiconductor dispersed a conductive fine particle formed by wet process, conductivity property failure is not caused.

(Example 4)

FIG. 17 is a cross-section of a substrate for a display device according to Embodiment 2. In FIG. 17, the same portions as those shown in FIG. 15 are denoted by the same references as in FIG. 15, and detailed explanation thereof will be omitted herefrom.

In the substrate for the display device shown in FIG. 17, an array substrate having an ITO pixel electrode for a liquid crystal display device at present is used. An transparent electrode 405 for electrochemical deposition and Cs storage forming are formed above the Cs line 403, and the contact between a source electrode 409 and a pixel electrode 412 is attained at contact portions 411a and 411b.

The substrate for the display device having the above structure can be manufactured in the following manner. MoTa alloy is sputtered with a thickness of 300 nm on the glass substrate 401, thereby to simultaneously form a gate electrode 402, an address line, and a Cs line 403. Subsequently, a silicon oxide film (or gate insulating film) is formed with a thickness of 400 nm by plasma CVD, and an a-Si active layer 406 having a thickness of 100 nm is formed and is subjected to patterning. Further, an SiNx stopper film 407 having a thickness of 50 nm is formed thereon and is subjected to patterning. Further, n$^+$a-Si active layers 408a and 408b having a thickness of 50 nm are formed on the a-Si active layer 406 and SiNxi stopper film 407, and are subjected to patterning.

Subsequently, ITO is sputtered with a thickness of 50 nm on the silicon oxide film 404 on the Cs line 403, and is subjected to patterning, thereby to form a transparent electrode 405 for electrochemical deposition and Cs storage forming. In the next, desired metal such as Al is sputtered and is subjected to patterning, thereby to simultaneously form a drain electrode 409, a source electrode 410, and a data lie (not shown).

In the next, as shown in FIG. 18A, a 5 weight % toluene solution 415 of methylenephenylpolysilane expressed in the formula 4 described before is coated with a film thickness of 2.0 μm by spin-coating, and subsequently, as shown in FIG. 18B, the entire surface is exposed with deep-UV light (300 to 340 nm) from the back surface of the array substrate. Through the back surface exposure process, a latent image 417 is formed in an opening portion (except for a signal line and a gate line) as shown in FIG. 18C. Next, the TFT array substrate is dipped in an electrochemical deposition solution having the following composition, and in this state, R pixels are batch-driven to color the region where the latent image is formed in red, so that an R-colored portion 413 is formed. In this case, as a common electrode, an SCE (Saturated Calomel Electrode) is used, and the pixel is applied with a voltage of +5V while the gate is applying with a voltage of +20V. Thereafter, the TFT array substrate is rinsed with pure water. In the same manner as above, G-colored and B-colored portions are formed. Further, the substrate is subjected to baking on a hot plate at 100° C. for 10 minutes. After the baking, the R-colored, G-colored, and B-colored portions 413 are respectively colored in red, green, and blue, and have an insulating property.

| (Composition of an electrochemical deposition solution for R, G, and B coloring (insulating)) | |
|---|---|
| pigment fine grains (average grain diameter 0.1 μm) (R: anthraquinone based, G: copperphthalocyanine based, B: copperchlorophthalocyanine based) | 1.0 g |
| ampliphilic PEG type interface activation ferrocene (FPEG) (Formula 1) | 0.2 g |
| LiBr | 1.3 g |
| acetonitrile | 15 ml |
| water | 135 ml |

In the next, as shown in FIG. 18D, the entire surface is exposed to light from the top surface of the substrate, to form a latent image 417 in non-opening portion. Subsequently, as shown in FIG. 18E, the TFT array substrate is dipped in a black electrochemical deposition solution having the following composition, and in this state, a voltage is applied to a signal line on condition that the gate has a potential same as the common electrode, thereby to selectively color the signal line in black. In this case, an SCE is used as a common electrode, and a voltage of +5V is applied to the signal line. Thereafter, this is rinsed with pure water, and is subjected to baking. After the baking, the portion 414 is black and has insulating property.

| (Composition of a black electrochemical deposition solution (insulating)) | |
|---|---|
| pigment fine grains (average grain diameter 0.3 μm) (a mixture of cyan pigment, violet pigment, and yellow pigment) ampliphilic PEG type interface activation | 5.0 g |
| ferrocene (FPEG) | 0.2 g |
| LiBr | 1.3 g |
| acetonitrile | 15 ml |
| water | 135 ml |

In the next, as shown in FIG. 18F, the TFT array substrate is dipped into a black electrochemical deposition solution having the following composition, and in this state, a gate is applied with a voltage of +20V, and the signal line is applied with a voltage, so that conductive fine grains enter on the latent images of the source electrode 409 and the electrode 405, thereby to form contact portions 411a and 411b. In this case, as a common electrode, an SCE is used and a voltage of +5V is applied to the signal line while the gate is applied with a voltage of +20V. Thereafter, the substrate is rinsed with pure water, and is subjected to baking. After the baking, these portions 411a and 411b are black and has conductivity property.

| (Composition of a black electrochemical deposition solution (conductive)) | |
| --- | --- |
| carbon black fine grains (average grain diameter 0.3 μm) | 5.0 g |
| ampliphilic PEG type interface activation ferrocene (FPEG) | 0.2 g |
| LiBr | 1.3 g |
| acetonitrile | 15 ml |
| water | 135 ml |

In the next, as shown in FIG. 18G, the TFT array substrate is dipped in an insulating black sol-gel solution having the same composition as used in Example 3, and thereafter, is rinsed with pure water. Further, a black matrix portion is formed, and the substrate is subjected to post-baking at 250° C. for 60 minutes. After the baking, the black matrix portion (not shown) is black and has an insulating property.

At last, as shown in FIG. 18H, ITO is sputtered with a thickness of 150 nm on organic-inorganic hybrid glass, and is subjected to patterning, to form a pixel electrode 412.

Meanwhile, ITO is sputtered on the opposing substrate, to form a common electrode. This opposing substrate and the TFT array substrate are arranged opposite to each other, to constitute a cell, and liquid crystal material is injected into the cell, to complete a liquid crystal display device.

Since the liquid crystal display device thus manufactured has a functional layer (e.g., a contact portion, R, G, and B portions, and a BM portion) is made of organic-inorganic hybrid glass, and since the contact portion between the pixel electrode 412 and the drain electrode 409 is made of a metal oxide semiconductor dispersed a conductive fine grains formed by wet process, conductivity property failures are not caused.

(Example 5)

FIG. 19 is a cross-section of a substrate for a display device according to Embodiment 2. In FIG. 19, the same portions as those shown in FIG. 15 are denoted by the same references as in FIG. 15, and detailed explanation thereof will be omitted herefrom.

In the substrate for the display device shown in FIG. 19, the contact between a transparent electrode 405 for Cs, connected to a source electrode 409, and a pixel electrode 412 is obtained by a contact portion 411 of the functional layer.

The substrate for the display device having the above structure can be manufactured in the following manner. The steps to be performed before the step of forming a TFT and R-, G-, and B-colored portions of the functional layer are the same as those taken in Example 4.

As shown in FIG. 20A, a 5 weight % toluene solution 415 of methylenephenylpolysilane expressed in the formula 4 described before is coated with a film thickness of 2.0 μm by spin-coating, and subsequently, as shown in FIG. 20B, the entire surface is exposed with deep-UV light (300 to 340 nm) from the back surface of the array substrate. Through the back surface exposure process, a latent image 417 is formed in an opening portion (except for a signal line and a gate line) as shown in FIG. 20B. Next, the TFT array substrate is dipped in an insulating electrochemical deposition solution abovementioned, and in this state, R pixels are batch-driven to color the region where the latent image is formed, in red, so that an R-colored portion 413 is formed (FIG. 20C). In this case, as a common electrode, an SCE is used, and the signal line is applied with a voltage of +5V while the gate is applied with a voltage of +20V. Thereafter, the TFT array substrate is rinsed with pure water. In the same manner as above, G-colored and B-colored portions are formed. Further, the substrate is subjected to baking on a hot plate at 100° C. for 10 minutes. After the baking, the R-colored, G-colored, and B-colored portions 413 are respectively colored in red, green, and blue, and have an insulating property.

In the next, as shown in FIG. 20D, the TFT array substrate is exposed with deep-UV light with use of a mask 416 by which the signal line and the TFT are covered and the Cs region is opened. In this manner, a latent image 417 is formed on polysilane resist above the Cs line 403 (while the R, G, and B portions 413 have already been vitrified and therefore are not changed by light). Subsequently, as shown in FIG. 20E, the TFT array substrate is dipped in a conductive black sol-gel solution having the same composition as used in Example 3, and thereafter, is rinsed with pure water. Further, the substrate is subjected to pre-baking at 100° C. for 10 minutes. After baking, the contact portion is black and has conductivity property.

Subsequently, as shown in FIG. 20F, the entire surface is exposed to light from the top surface of the substrate, to form a latent image 417 in the remaining portion. Subsequently, as shown in FIG. 20G, the TFT array substrate is dipped in an insulating black electrochemical deposition solution having the same composition as in Example 3, and thereafter, is rinsed with pure water, to form a black matrix portion 414. Subsequently, the substrate is subjected to post-baking at 250° C. for 60 minutes. After the baking, the black matrix portion 414 is black and has an insulating property.

At last, as shown in FIG. 20H, ITO is sputtered with a thickness of 150 nm on the functional layer, and is subjected to patterning, to form a pixel electrode 412.

Meanwhile, ITO is sputtered on the opposing substrate, to form a common electrode. This opposing substrate and the TFT array substrate are arranged opposite to each other, to constitute a cell, and liquid crystal material is injected into the cell, to complete a liquid crystal display device.

Since the liquid crystal display device thus manufactured has a functional layer (e.g., a contact portion, R, G, and B portions, and a BM portion) is made of organic-inorganic hybrid glass, and since the contact portion 411 between the pixel electrode 412 and the transparent electrode for Cs connected to the source electrode 409 is made of a metal-oxide semiconductor dispersed conductive five grains formed by wet process, conductive failure are not caused.

(Example 6)

Figure 22:
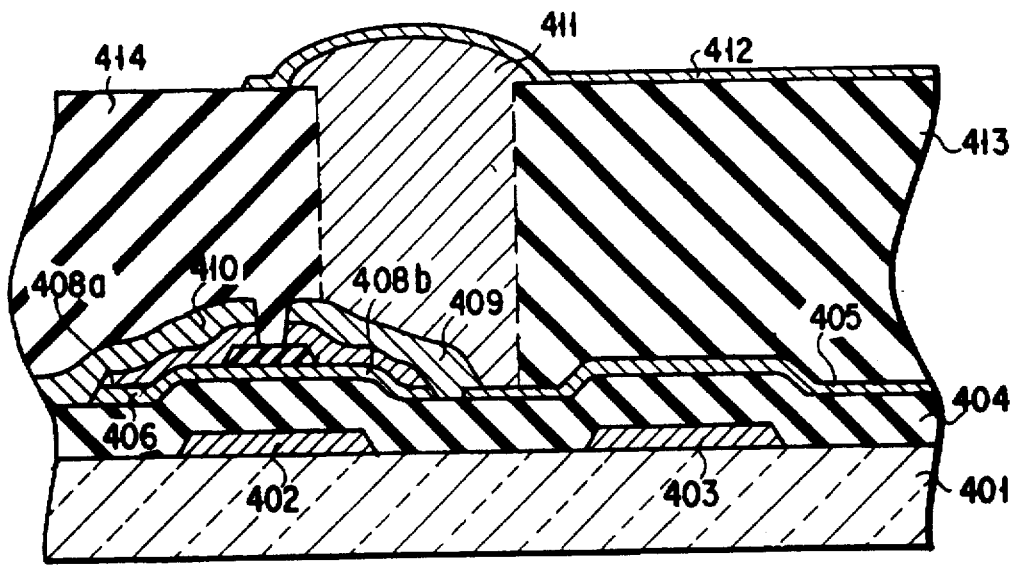

FIGS. 21 and 22 are cross-sections of a substrate for a display device according to Embodiment 2 of the present invention. In FIGS. 21 and 22, the same portions as those shown in FIG. 15 are denoted by the same references as in FIG. 15, and detailed explanation thereof will be omitted herefrom.

In the substrate (or array substrate) for the display device shown in FIG. 21, the contact between a transparent electrode 405 for Cs, connected to a source electrode 409, and a pixel electrode 412 is obtained by a conductive polymer embedded in a contact hole provided in the color filter layer. Therefore, the substrates of FIGS. 21 and 22 are only different from each other in the positions where the contact holes are to be formed, and require equal manufacturing process.

The TFT array substrate having the structure described above can be manufactured in the following manner. The steps to be performed before the step of forming a TFT and R-, G-, and B-colored portions of the functional layer are the same as those taken in Example 4.

Figure 23A:
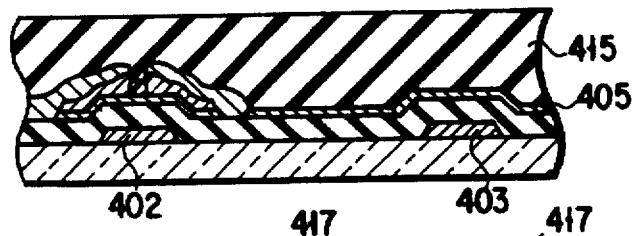
Figure 23B:
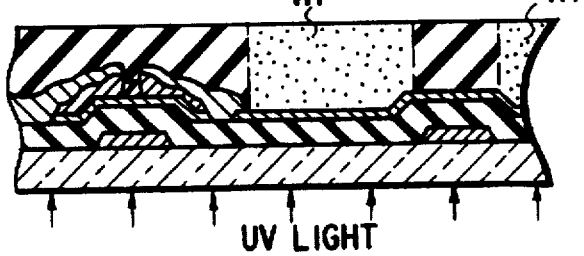
Figure 23C:
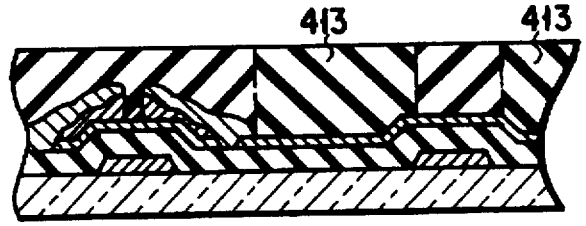

As shown in FIG. 23A, a 5 weight % toluene solution 415 of methylenephenylpolysilane expressed in the formula 4 described before is coated with a film thickness of 2.0 μm by spin-coating, and next, as shown in FIG. 23B, the entire surface is exposed with deep-UV light (300 to 340 nm) from the back surface of the array substrate. Through the back surface exposure process, a latent image 417 is formed in an opening portion (except for a signal line and a gate line) as shown in FIG. 23B Next, the TFT array substrate is dipped in an insulating electrochemical deposition solution as abovementioned, and in this state, R pixels are batch-driven to color the region where the latent image is formed, in red, so that an R-colored portion 413 is formed. In this case, as a common electrode, an SCE is used, and the signal line is applied with a voltage of +5V while the gate is applied with a voltage of +20V. Thereafter, the TFT array substrate is rinsed with pure water. In the same manner as above, G-colored and B-colored portions are formed. Further, the substrate is subjected to baking on a hot plate at 100° C. for 10 minutes. After the baking, the R-colored, G-colored, and B-colored portions 413 are respectively colored in red, green, and blue, and have an insulating property.

Figure 23D:
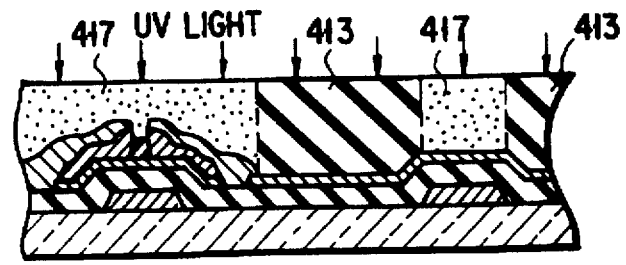
Figure 23E:
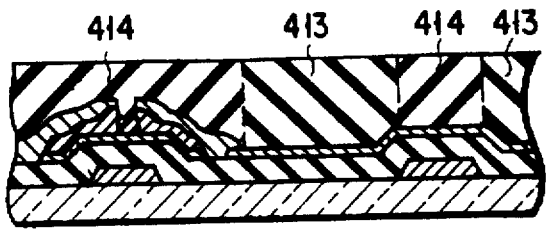

In the next, as shown in FIG. 23D, the entire surface of the TFT array substrate is exposed with deep-UV light from the top surface of the substrate, to form a latent image 417 in the remaining portion (while the R, G, and B portions 413 have already been vitrified and therefore are not changed by light). Subsequently, as shown in FIG. 23E, the TFT array substrate is dipped in an insulating black sol-gel solution having the same composition as described in Example 3, and thereafter, is rinsed with pure water, thereby to form a black matrix portion 414. Next, the post-baking at 250° C. for 60 minutes. After the baking, the black matrix portion 414 is black and has an insulating property.

Figure 23F:
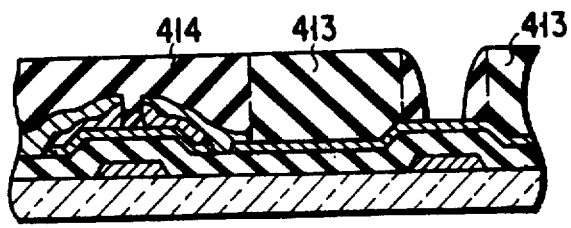
Figure 23G:
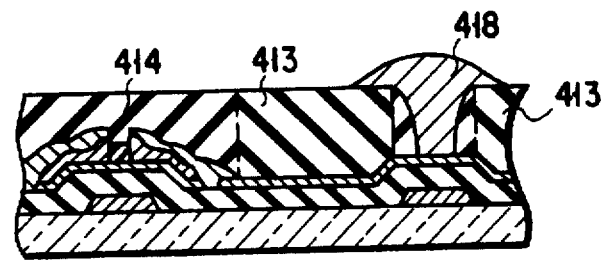

In the next, as shown in FIG. 23F, of the black matrix portion, the contact portion in contact with the pixel electrode is selectively etched by RIE. Subsequently, as shown in FIG. 23G, the TFT is batch-driven while the TFT array substrate is dipped in an electrolytic solution containing a monomer which forms a conductive polymer having the following composition, thereby to form a conductive polymer 418 in the contact hole portion. In this case, an SCE is used as a common electrode, and a signal line is applied with a voltage of +5V while the gate is applied with a voltage of 20V. Thereafter, this is rinsed with pure water. The contact portion 411 thus formed is black and has conductivity property.

| (Composition of an electrolytic polymerization solution) | |
|---|---|
| pyrrole | 25 ml |
| LiClO$_4$ | 10 g |
| acetonitrile | 1000 ml |

Figure 23H:
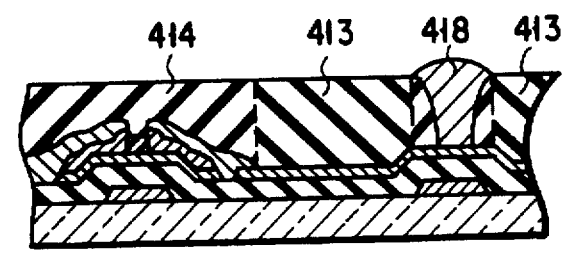
Figure 23I:
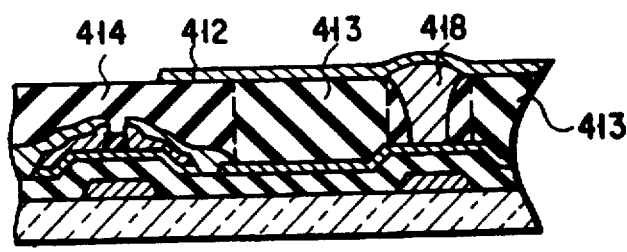

Subsequently, as shown in FIG. 23H, the TFT array is dried, and thereafter, UV-cleaning is performed at 254 nm and 1 J/cm$^2$, to remove a conductive polymer sticking to the surface. At last, as shown in FIG. 23I, ITO is sputtered with a thickness of 150 nm on the functional layer, and is subjected to patterning, to form a pixel electrode 412.

Meanwhile, ITO is sputtered on the opposing substrate, to form a common electrode. This opposing substrate and the TFT array substrate are arranged opposite to each other, to constitute a cell, and liquid crystal material is injected into the cell, to complete a liquid crystal display device.

Since the liquid crystal display device thus manufactured has a functional layer (e.g., a contact portion, R, G, and B portions, and a BM portion) is made of organic-inorganic hybrid glass, and since the contact portion (411) between the pixel electrode 412 and transparent electrode for Cs (405) connected to the source electrode 409 is made of a conductive polymer formed by wet process, conductive failures are not caused.

(Example 7)

FIG. 24 is a view showing another method of manufacturing the substrates for the display device of FIGS. 21 and 22. The step of preparing a TFT on a glass substrate 401 is performed in the same manner as in Example 4.

Figure 24A:
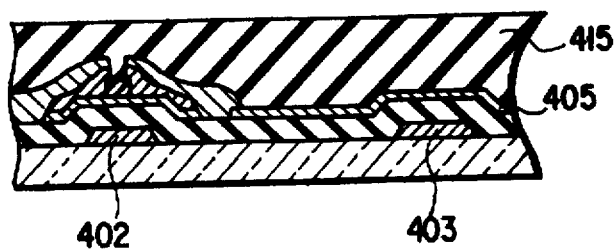

At first, as shown in FIG. 24A, a 5 weight % toluene solution 415 of methylenephenylpolysilane expressed in the formula 4 described before is coated with a film thickness of 2.0 μm by spin-coating, and next, as shown in FIG. 24B, the pixel portion 413R of R is selectively exposed with deep-UV light (280 to 320 nm) through a photo mask, to form a latent image 417. In the next, the TFT array substrate is dipped in an insulating red sol-gel solution having the same composition as described in Example 3, and thereafter, is rinsed with pure water. The substrate is subjected to baking at 100° C. for 10 minutes. In this manner, an R-colored portion 413 is formed. In the same manner, as described above, G-colored and B-colored portions are formed.

In the next, the entire surface of the TFT array substrate is exposed with deep-UV light, to form a latent image in a black matrix portion. The substrate is dipped in an insulating black sol-gel solution having the same composition as described in Example 3, and thereafter, is rinsed with pure water, to form a black matrix portion 414. Next, the substrate is subjected to post-baking at 250° C. for 60 minutes. After the baking, the R-, G-, B-colored portions 413 and the black matrix portion 414 become glass which has an insulating property.

Next, as shown in FIG. 24D, the contact portion which is in contact with the pixel electrode is selectively etched by RIE. Subsequently, as shown in FIG. 24E, the TFT is batch-driven while the TFT array substrate is dipped in an electrolytic solution containing a monomer which forms a conductive polymer as abovementioned, thereby to form a conductive polymer 418 in the contact hole portion. The contact portion 411 thus formed is black and has conducting property.

Subsequently, the TFT array is prebacked, and thereafter, as shown in FIG. 24F, UV-cleaning is performed at 254 nm and 1 J/cm$^2$, to remove a conductive polymer sticking to the surface. At last, as shown in FIG. 24G, ITO is sputtered with a thickness of 150 nm on the functional layer, and is subjected to patterning, to form a pixel electrode 412.

Meanwhile, ITO is sputtered on the opposing substrate, to form a common electrode. This opposing substrate and the TFT array substrate are arranged opposite to each other, to constitute a cell, and liquid crystal material is injected into the cell, to complete a liquid crystal display device.

Since the liquid crystal display device thus manufactured has a functional layer (e.g., a contact portion, R, G, and B portions, and a BM portion) is made of organic-inorganic hybrid glass, and since the contact portion 418 between the pixel electrode 412 and the transparent electrode for Cs (405) connected to the source electrode 409 is made of a conductive polymer formed by wet process, conductive failures are not caused.

In Embodiment 2, examples in which organic-inorganic hybrid glass is used for the functional layer have been explained. However, organic-inorganic hybrid glass formed in the same process as described above may be adopted as a passivation film provided between the pixel electrode and the TFT on the array substrate. In this case, conditions in the process described above may be appropriately changed for application. For example, in an electrochemical deposition step, TFTs of all the pixels are batch-driven, and an electrochemical deposition solution does not contain a pigment.

As has been described above, according to Embodiment 2, it is possible to provide a color filter on-array substrate with contact failure free and with high reliability in pixel-top structure. In addition, by using this substrate, the aperture can be improved to be high, and a liquid crystal display device with high image quality and a low power consumption can be provided.

(Examples 8 to 11)
(Example 8)

Figure 25:
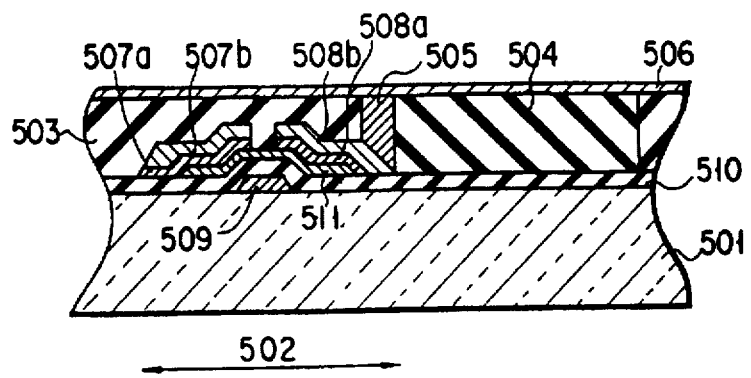
FIG. 25 is a cross-section showing the substrate for the display device according to Embodiment 2.

FIG. 25 is a cross-section of a substrate for a display device according to Embodiment 2 of the present invention. In the figure, the reference 501 denotes a glass substrate. On the glass substrate 501, a gate electrode 509 is formed and a gate insulating film 510 made of silicon oxide is formed thereon. On the gate insulating film 510, an i-Si semiconductor layer 511 is formed by patterning, and n$^+$a-Si layers 507a and 508a are formed, separated from each other. Further, source and drain electrodes 508b and 507b are formed on the n$^+$a-Si layers 507a and 508a. A TFT 502 is thus formed.

On the TFT and gate insulating film 510, a functional layer is provided. The functional layer includes a black matrix portion 503 on the TFT 502, a contact portion 505 for electrically connecting the source and pixel electrodes 507b and 506 with each other, and colored portions 504. In addition, a pixel electrode 506 is formed on the functional layer.

The substrate (or array substrate) for the display device having the structure described above can be manufacture in the following manner. At first, a TFT 502 is formed on a glass substrate 501 made of non-alkali glass such as glass known by commercial names of 7057 available from Corning, NA-45 available from NH-Technoglass, and OA-2 available from Nippon Denki Glass. Specifically, Ta, Mo—Ta or the like is coated on the glass substrate 501 by sputtering or the like, and is subjected to patterning, thereby to form a gate line 509, and Ta$_2$O$_5$, SiN$_x$, Al$_2$O$_3$ and the like are coated thereon by sputtering, CVD, or the like, thereby to form a gate insulating film 510. On the gate insulating film 510, i-Si (intrinsic semiconductor amorphous silicon) or the like is coated on the gate insulating film 510 by CVD or the like, and is subjected to patterning, thereby to form an i-Si semiconductor layer 511. Further, on the layer 511, n$^+$a-Si (or Ti) is coated and is subjected to patterning, thereby to form n$^+$a-Si layers 507a and 508a. On the n$^+$a-Si layers 507a and 508a, drain and source electrodes 507b and 508b are selectively formed.

Figure 26A:
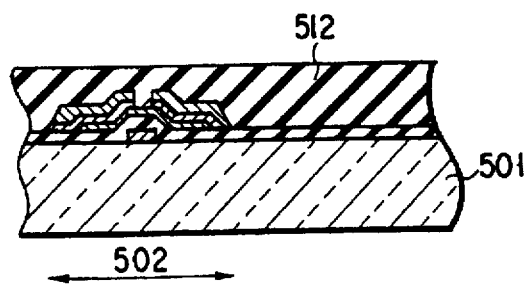
FIGS. 26A to 26G are cross-sections showing the method of manufacturing the substrate for the display device shown in FIG. 25.

As shown in FIG. 26A, a solution in which a polysilane composite is dissolved in an organic solvent is applied, by a spin-coater, onto a glass substrate 501 on which the TFT 502 is formed. As polysilane, polyphenylmethyl/methyltrifluoropropylsilane is used which satisfies the formulas 2 and 3, where R$_1$ and R$_3$ are methyl groups, R$_2$ is a phenyl group, and R$_4$ is a trifluoropropyl group. As the polysilane composition, a toluene solution is used which is added with 8 weight part of a silicon rubber composition (which contains 98.9 weight part of dimethylsilicon oil YE3902 (available from Toshiba silicon), 1 weight part of methyltriacetoxysilane, and 0.1 weight part of dibutyltindilaurate) as a crosslinking agent, and 15 weight part of diethylene glycol dibenzoate as an ethylene-based compound. The concentration of the solid part of this solution is 30 weight %. After this solution is applied, the solution is prebaked with use of a hot plate. The thickness of a polysilane layer 512 thus obtained is 2.5 μm.

Figure 26B:
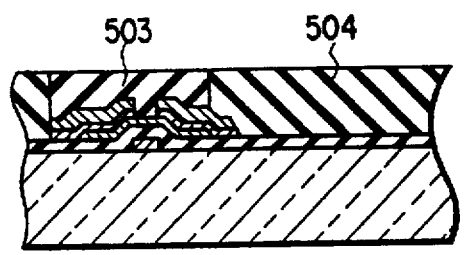

Subsequently, as shown in FIG. 26B, R-, G-, and B-colored portions and a black matrix portion are sequentially formed. Specifically, after ultraviolet light is exposed to the polysilane layer corresponding to the R-colored portion, thereby to generate a hydrophilic silanol group (Si—OH bonding), R-colored portion 504 is formed by dipping the array substrate to a real sol solution, and subsequently, G- and B-colored portions, and a black matrix portion 503 are formed in a similar manner. Note that exposure is performed with use of a medium pressure mercury lamp, with a light amount of 5 J/cm$^2$. The polysilane layer which is not exposed with ultraviolet light remains as an organic polysilane layer.

Figure 26C:
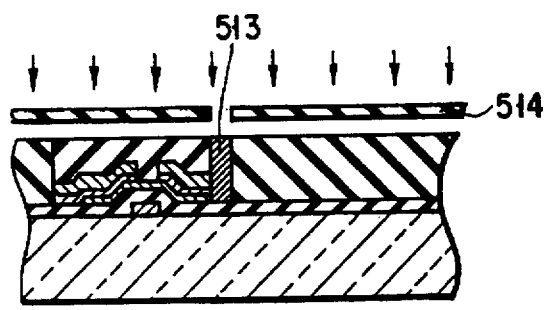
Figure 26D:
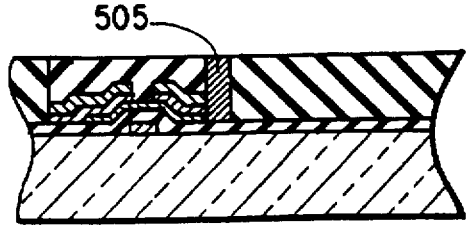

In the next, as shown in FIG. 26C, a portion 513 where colored portions 504 and a black matrix portion 503 are not formed is irradiated with ultraviolet light with use of a mask 514. Subsequently, as shown in FIG. 26D, the array substrate is dipped in a conductive sol solution in which fine grains of ITO are dispersed, thereby to form a contact portion 505. Thereafter, the array substrate is subjected to water rinsing, and then to baking at 100° C. for 30 minutes, thereby to complete the functional layer including the colored portions, black matrix portion, and contact portion.

Note that, the coloring sol solution used above is a sol solution in which fine grains of pigment are dispersed, and the conductive sol is a sol solution in which fine grains of ITO are dispersed. These sol solutions are prepared in the following manner. As metal alkoxide as starting raw material, tetraethoxysilane is used. A solution including 100 weight part of tetraethoxysilane, 100 weight part of ethyl alcohol, and 70 weight part of pure water is added with 20 weight part of fine grains of pigment having an average grain diameter of 0.1 μm or fine grains of ITO having an average grain diameter of 0.1 μm, and are dispersed therein while stirring the solution at a normal temperature for 30 minutes. Thereafter, 0.3 weight part of a hydrochloric acid is added thereto, and is dispersed therein while stirring the solution at a normal temperature for two hours, and simultaneously making the solution colloidal. 100 weight part of a colored sol solution or a conductive sol solution thus obtained is added with 300 weight part of pure water and 300 weight part of a sol solution prepared in steps similar to the above, and is thus diluted, thereby to obtain a colored sol solution or a conductive sol solution.

Dipping into the colored sol solution or conductive sol solution is terminated in 10 to 15 minutes at a normal temperature. If the temperature of the sol solution is increased, the dipping time can be shortened. In this case, however, pin holes are easily formed due to re-dissolution of the polysilane layer, and therefore, the temperature of the sol solution should preferably be 40° C. or less, and more preferably 30° C. or less.

Note that a black matrix portion or the like can be formed with use of an ink jet technique such as an ink jet method which is used for a recording technique may be used to form the colored portions and black portion, in place of exposing the polysilane layer and dipping this layer into a sol solution.

Figure 26E:
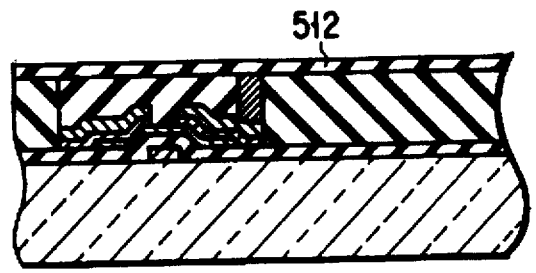
Figure 26G:
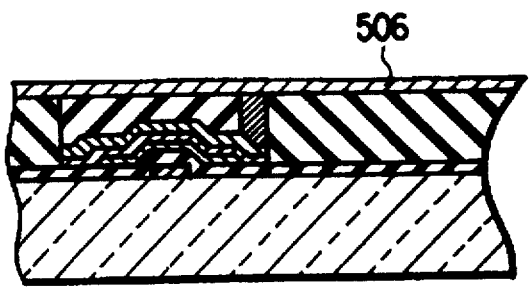
Figure 26F:
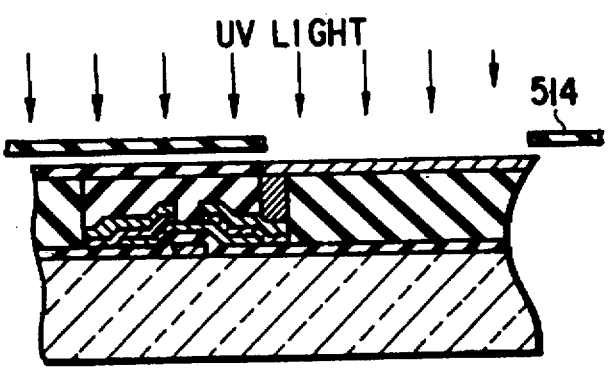

In the next, as shown in FIG. 26E, the same polysilane composition as above is applied with use of a spin-coater, again, and is prebaked, to form a polysilane layer 512 having a thickness of 0.5 μm. Thereafter, as shown in FIG. 26F, the polysilane layer 512 is exposed with ultraviolet light with use of a mask 514 in which a portion corresponding to the pixel electrode is opened. As shown in FIG. 26G, the array substrate is dipped in a conductive sol solution in which fine grains of ITO are dispersed, to form a pixel electrode 506.

29

In the substrate for a display device, thus obtained, the surface roughness is extremely small, and an excellent electric connection is obtained between the pixel electrode and the TFT.

(Example 9)

Figure 27:
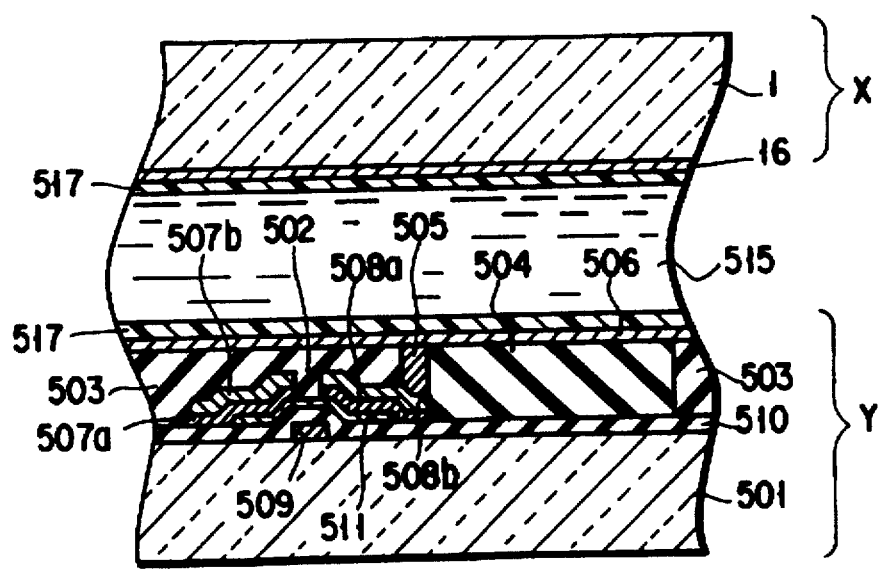

FIG. 27 is a cross-section of a liquid crystal display device according to Embodiment 2 of the present invention. This liquid crystal apparatus mainly comprises an opposing substrate X formed on a glass substrate 501 with a transparent electrode 516 of ITO or the like and an alignment film 517, a TFT array substrate Y having the structure shown in FIG. 25, and a liquid crystal layer 515 interposed between the opposing substrate X and the TFT array substrate Y. Note that an alignment film 517 is formed on the TFT array substrate Y, and the opposing substrate X and the TFT array substrate Y are arranged such that their own opposing films oppose each other.

Figure 28A:
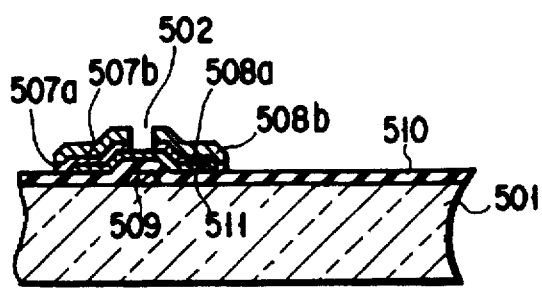

The liquid crystal display device having the above structure can be manufactured in the following manner. Note that in the TFT array substrate Y, the steps of preparing a TFT 502 on the glass substrate 501 are the same as those in Example 8, as shown in FIG. 28A, and therefore, detailed explanation thereof will be omitted.

Figure 28B:
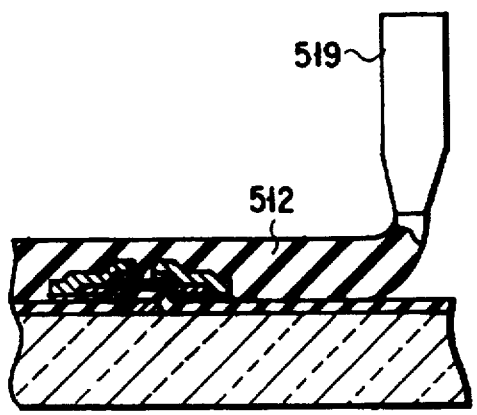

As shown in FIG. 28B, a solution in which a polysilane composition is dissolved in an inorganic solvent is applied onto the glass substrate 501, and is subjected to reduced-pressure prebaking, and further to prebaking in a clean oven at 100° C. for 30 minutes, thereby to form a polysilane layer 512 having a thickness of 2 μm.

Here, as polysilane, polyphenylmethylsilane ($CH_3C_6H_5Si$) is used which satisfies the formulas 2 and 3 describe above, where $R_1$ and $R_3$ are methyl groups, and $R_2$ and $R_4$ are phenyl groups. A toluene solution (having a solid portion concentration of 20 weight %) is used in which 100 weight part of polyphenylmethylsilane is added with 2 weight part of a silicon rubber composition (which consists of 98.9 weight part of dimethylsilicon oil YE3902 (available from Toshiba Silicon), 1 weight part of methyltriacetoxysilane, and 0.1 weight part of dibutyltindilaurate) as a crosslinking agent, and with 30 weight part of n-butylaurate as ester compound.

Figure 28C:
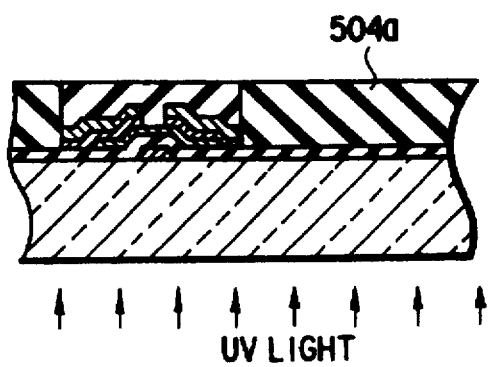

In the next, as shown in FIG. 28C, the portion 504a of the polysilane layer corresponding to an R-colored portion is exposed with ultraviolet light from the back surface. In this state, those portions of the polysilane layer which correspond to G-colored and B-colored portions are covered with a mask not shown, so that these portions are not exposed. In addition, since the TFT portion does not allow light to pass, only the portion 504a corresponding to the R-colored portion is exposed, and a silanol group is generated there. Note that a medium mercury lamp is used for the exposure, at a light amount of 4 to 5 J/cm². However, another kind of light source may be used as long as such a light source generates light having a wavelength within a range of 250 to 400 nm which is an ultraviolet absorption range of polysilane.

Figure 28D:
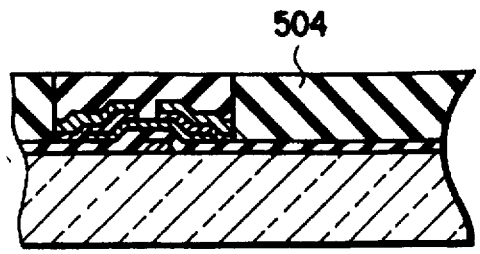

Thereafter, as shown in FIG. 28D, an array substrate is dipped in a solution in which red pigment (e.g., Pig. Red 177) and yellow pigment for color correction (e.g., Pig. Yellow 139) are dispersed, at a normal temperature for 10 to 15 minutes. This substrate is then subjected to water rinsing, and then to prebaking at 100° to 115° C. for 30 minutes, to form an R-colored portion. In the same manner, G- and B-colored portions are formed. Note that the portions to be colored in red, green, and blue are exposed for one time, if coloring is performed with use of an ink jet method, in place of a dipping method.

The coloring sol solution is prepared in the following manner. A solution containing 100 weight part of

30 tetraethoxysirane, 100 weight part of ethanol, and 70 weight part of pure water is added with the pigment described above (the weight ratio of R to Y is 70:30) and is dispersed while stirring the solution at a normal temperature for 30 minutes. Thereafter, the solution is added with 0.3 weight part of hydrochloric acid, and is further dispersed at a normal temperature for an hour. Thereafter, 3 weight part of a sol solution not containing a coloring agent and 3 weight part of pure water to 1 weight part of a coloring sol solution are added and diluted to obtain a coloring sol solution.

Figure 28E:
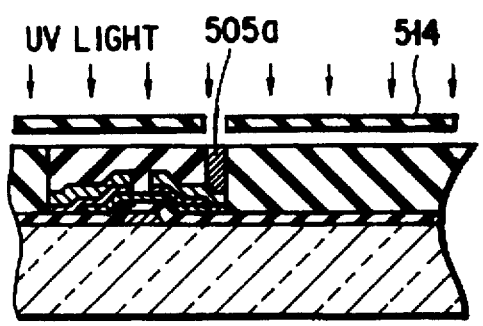
Figure 28F:
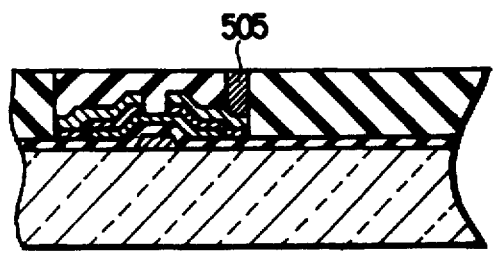

Subsequently, as shown in FIG. 28E, the portion 505a which corresponds to a contact portion is exposed with ultraviolet light from the top surface of the substrate, with use of a mask 514 having an opening portion corresponding to the contact portion. Subsequently, as shown in FIG. 28F, the TFT array substrate is dipped in a conductive sol solution in which fine grains of ITO are dispersed, and thereafter, this substrate is subjected to water rinsing, and then to prebaking at 100° C. to 115° C. for 30 minutes, thereby to form a contact portion 505. Note that, the conductive sol solution is prepared by substituting the pigment content of the coloring sol solution described above with fine grains, and can be obtained in a manner similar to the coloring sol solution.

Figure 28G:
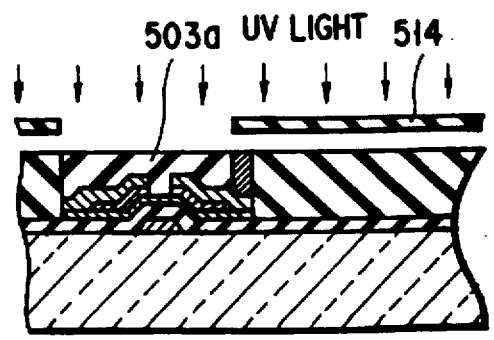

In the next, as shown in FIG. 28G, the portion 503a of the polysilane layer which corresponds to a black matrix portion is exposed from the top surface of the substrate, with use of a mask in which a portion corresponding to a black matrix is opened. Sub-sequently, as shown in FIG. 28H, the TFT array substrate is dipped in a black coloring sol solution in which R pigment, B pigment, yellow (Y) pigment, and violet (V) pigment are dispersed (at a weight ratio of R, B, Y, and V is 15:20:20:15), and is subjected to water rinsing, and then to prebaking at a temperature of 100° to 115° C. for 30 minutes, to form a black matrix portion 503. Note that this coloring sol solution can be obtained in a manner similar to the coloring sol solution described above.

In the next, as shown in FIG. 28I, the nozzle coat method is used again to apply a solution 518 in which a polysilane composition is dissolved in an organic solvent, and is then prebaked. Thereafter, as shown in FIG. 28J, the polysilane layer is exposed with use of a mask 514 in which a portion corresponding to a pixel electrode is opened. Subsequently, the TFT array substrate is dipped in a conductive sol solution in which fine grains of ITO are dispersed, thereby to form a contact portion 505 and a pixel electrode 506, as shown in FIG. 28K. Further, an alignment film 517 is formed on the pixel electrode 506, and is subjected to rubbing processing.

Meanwhile, a transparent electrode 516 is formed on the glass substrate 501. An alignment film 517 is formed thereon, and is subjected to rubbing processing.

An opposing substrate X thus obtained and a TFT array substrate Y are arranged such that their own opposing films 517 oppose each other, and a liquid crystal layer 515 is provided between the substrates, thereby to complete a liquid crystal apparatus.

In a liquid crystal display device thus obtained, since the TFT array substrate Y has extremely small surface roughness and an excellent electric connection is obtained between a pixel electrode and the TFT, the liquid crystal display device achieves an excellent color reproductivity and an excellent contrast.

(Example 10)

A liquid crystal display device is prepared in the same manner as in Example 9, except that rubbing processing is directly performed on the surface where color portions, a contact portion, a black matrix portion, and a pixel electrode are formed with use of polysilane, without forming an alignment film 517 on the TFT array substrate. The rubbing processing is performed after a contact portion 505 and a pixel electrode 506 are formed. Thereafter, prebaking are performed. Note that rubbing processing may, otherwise, be performed after prebaking.

The liquid crystal display device thus obtained has a TFT array substrate Y whose surface roughness is extremely small and attains an excellent electric connection between a pixel electrode and a TFT. Therefore, the liquid crystal display device achieves an excellent color reproductivity and a high contrast. In addition, according to the method of Example 10, an alignment film forming step and an alignment processing step can be omitted.

(Example 11)

The liquid crystal apparatus according to Embodiment 2 may have a structure in which a pixel electrode 506 is formed only on a contact portion 505 and colored portions 504 of the functional layer, but is not provided on a black matrix portion 503. Specifically, an alignment film 517 is directly formed on the black matrix portion 503.

As described above, in the substrate for the display device, according to Embodiment 2, the TFT and the pixel electrode formed on the functional layer can be easily connected to each other via the functional layer without a complicated process. Further, the R, G and B coloring portions, the black matrix portion and the contact portion are formed in the same functional layer, and therefore it is possible to provide a substrate for a display device, having an excellent flatness.

Embodiment 3

In Embodiment 3, an accumulation capacitor is formed by interposing the entire aperture portion made of the organic-inorganic hybrid glass between ITO electrodes to form, for the purpose of enhancing the aperture ratio. Further, the gate insulation film of the switching element is made of the organic-inorganic hybrid glass, for the purpose of decreasing the temperature of the gate insulation film formation process.

An example of Embodiment 3 will now be described.

(Example 12)

FIG. 30 is a cross-section of a substrate (or array substrate) for a display device according to Embodiment 3. In the figure, the reference 301 denotes a glass substrate. A gate line 302 and a metal portion 303a of a Cs line are formed on the glass substrate 301, and a transparent portion 303b of the Cs line is formed on the metal portion 303a. A silicon oxide film 304 is formed thereon. The transparent portion 303b is made of ITO, and is partially covered with the silicon oxide film 304. On the silicon oxide film 304, an a-Si active layer 306 is formed by patterning, and an SiNx stopper film 307 is formed on a part of the a-Si active layer 306. Further, n$^+$a-Si layers 308a and 308b are formed, separated from each other, on the a-Si active layer 306 and the SiNx stopper film 307. Further, source and drain electrodes 309 and 310 are formed on the n$^+$a-Si layers 308a and 308b, such that the electrodes cover an end portion of the a-Si active layer 306.

On the TFT and Cs line thus formed, functional layers 313, 314a, and 314b are formed. These functional layers include R, G, and B regions 313 having insulating property, a black contact region 314a, having conductive property, electrically connected to a pixel electrode 312 provided on the functional layer, and a black matrix region 314b having insulating property.

The TFT array substrate constituted in the above structure can be manufactured in the following manner. At first, MoTa alloy is sputtered with a thickness of 300 nm on the glass substrate 301 and is subjected to patterning, thereby to simultaneously form a gate line 302, an address line (not shown), and a metal portion 303a of a Cs line.

Subsequently, ITO is sputtered on the metal portion 303a with a thickness of 150 nm and is subjected to patterning, to form a transparent portion 303b of a Cs line. Subsequently, a silicon oxide film (or gate insulating film) 304 having a thickness of 400 nm is formed thereon by plasma CVD, an a-Si active layer 306 having a thickness of 100 nm, is formed and is subjected to patterning. An SiNx i-stopper film 307 is further formed thereon, and is subjected to patterning. Further, n$^+$a-Si layers 308a and 308b having a thickness of 50 nm are formed on the a-Si active layer 306 and the SiNxi stopper film 307, and are subjected to patterning. Subsequently, predetermined contact metal such as Al or the like is sputtered and is subjected to patterning, thereby to simultaneously form a source electrode 309, a drain electrode 310, and a data wiring.

In the next, a 5 weight % toluene solution of methylenephenylpolysilane expressed in the following formula 4 is coated at a film thickness of 2.0 μm by spin-coating, and the contact portion 314a making a contact with the pixel electrode is exposed with deep-UV light (280 to 320 nm) through a photo-mask. In the next, the TFT array substrate is dipped in a conductive black sol/gel solution having the following composition, and is thereafter rinsed with pure water. Further, the resultant is subjected to baking at 100° C. for 10 minutes. After the baking, the contact portion 314a becomes black, and has a conductive property.

| (Composition of a black sol-gel solution for a contact portion (conductive)) | |
|---|---|
| carbon black fine grains (average grain diameter 0.3 μm) | 5 g |
| methanol (CH$_3$OH) | 30 ml |
| indiumacetylacetonate (In(COCH$_2$COCH$_3$)) | 20 ml |
| tinacetylacetonate (Sn(COCH$_2$COCH$_3$)) | 1 ml |
| water | 85 ml |
| hydrochloric acid (HCl) | 0.25 ml |
| acetonitrile | 8 ml |

In the next, in process similar to the above, pixel portions of R, G, and B are prepared. In this case, the composition of a sol-gel solution is described below. After baking, the R, G, and B regions have an insulating property.

| (Composition of a sol-gel solution for R, G, and B (insulating)) pigment (average grain diameter 0.1 μm) (different between R, G, and B) | 0.5 to 1.5 g |
|---|---|
| methanol (CH$_3$OH) | 30 ml |
| tetraethoxysilane (Si(OC$_2$H$_5$)$_4$) | 20 ml |
| water | 85 ml |
| hydrochloric acid (HCl) | 0.25 ml |
| acetonitrile | 8 ml |

In the next, the entire surface of the TFT array substrate is exposed to light, and the process similar to the above is performed thereafter, to form a black matrix portion (or insulating portion) 314b. In this case, the composition of the sol-gel solution will be described below. In the next, baking is performed at 250° C. for 60 minutes. The BM portion 314b becomes black and has an insulating property.

(Composition of a sol-gel solution for an insulating black matrix)

| | |
|---|---|
| pigment (average grain diameter 0.3 μm, a mixture of R pigment, G pigment, B pigment, cyan pigment, violet pigment, and yellow pigment) | 5 g |
| methanol (CH₃OH) | 30 ml |
| tetraethoxysilane (Si(OC₂H₅)₄) | 20 ml |
| water | 85 ml |
| hydrochloric acid (HCl) | 0.25 ml |
| acetonitrile | 8 ml |

The functional layer is formed in this manner. At last, ITO is sputtered with a thickness of 150 nm on the functional layer, and is subjected to patterning, to form a pixel electrode 312.

Meanwhile, ITO is sputtered on the opposing substrate, to form a common electrode. This opposing substrate and the TFT array substrate are arranged opposite to each other, to constitute a cell, and liquid crystal material is injected into the cell, to complete a liquid crystal display device.

Since the liquid crystal display device thus manufactured has a functional layer (e.g., a contact portion, R, G, and B portions, and a BM portion) is made of organic-inorganic hybrid glass, the apparatus achieves high reliability. The device realizes a high aperture, since a Cs portion almost corresponds to opening portion.

(Example 13)

FIG. 31 is a cross-section of a substrate (or array substrate) for a display device according to Embodiment 3. In FIG. 31, the same portions as those shown in FIG. 30 are denoted by the same references as in FIG. 30, and detailed explanation thereof will be omitted herefrom.

In the substrate for the display device shown in FIG. 31, a silicon oxide film 304 is formed so as to cover the metal portion 303a of the Cs line, and a transparent portion 303b of the Cs line is formed on the silicon oxide film 304. Contact between the metal portion 303a and transparent portion 303b is achieved by a contact hole provided in the silicon oxide film 304.

The substrate for the display device having the above structure can be manufactured in the following manner. MoTa alloy is sputtered with a thickness of 300 nm on the glass substrate 301, thereby to simultaneously form a gate line 302, an address line (not shown), and a metal portion 303a of a Cs line. Subsequently, a silicon oxide film (or gate insulating film) 304 is formed with a thickness of 400 nm by plasma CVD, and is subjected to patterning. In the next, a contact hole is provided in the silicon oxide film 304 on the metal portion 303a, and ITO is sputtered with a thickness of 150 nm on the silicon oxide film 304, to form a transparent portion 303b of the Cs line. In this state, the metal portion 303a and the transparent portion 303b are electrically connected to each other by a contact hole.

The subsequent steps (formation of a TFT, a functional layer, and a pixel electrode) are performed in the same manner as described in Example 12.

Meanwhile, ITO is sputtered on the opposing substrate, to form a common electrode. This opposing substrate and the TFT array substrate are arranged opposite to each other, to constitute a cell, and liquid crystal material is injected into the cell, to complete a liquid crystal display device.

Since the liquid crystal display device thus manufactured has a functional layer (e.g., a contact portion, R, G, and B portions, and a BM portion) is made of organic-inorganic hybrid glass, the apparatus achieves high reliability. The device realizes a high aperture, since the Cs line almost corresponds to opening portion.

(Example 14)

FIG. 32 is a cross-section of a substrate (or array substrate) for a display device according to Embodiment 3. In FIG. 32, the same portions as those shown in FIG. 30 are denoted by the same references as in FIG. 30, and detailed explanation thereof will be omitted herefrom.

In the substrate (or array substrate) for the display device of FIG. 32, a silicon oxide film 304 is provided on the gate line 302 and a metal portion 303a of a Cs line, and the region functioning as a gate insulating film is made to be insulating while the region functioning as a transparent portion 303b of the Cs line is made conductive.

On the TFT and Cs line thus formed, functional layers 313, 314a, and 314b are formed. These functional layers include R, G, and B regions 313 having insulating property, a black contact region 314a, having conductive property, electrically connected to a pixel electrode 312 provided on the functional layer, and a black matrix region 314b having insulating property.

The substrate constructed in the above structure can be manufactured in the following manner. MoTa alloy is sputtered with a thickness of 300 nm on the glass substrate 301 and is subjected to patterning, thereby to simultaneously form a gate line 302, an address line (not shown), and a metal portion 303a of a Cs line. Subsequently, a 5 weight % toluene solution of methylphenylpolysilane (expressed by the formula 4) is coated by spin-coating thereon, and the portion of the gate insulating film 304 is selectively exposed to deep-UV light (280 to 320 nm) through a photo-mask. In the next, the glass substrate is dipped in a sol-gel solution having a composition described below, and thereafter, is rinsed with pure water. Further, the glass substrate is subjected to baking at 100° C. for 10 minutes. After the baking, this portion 304 has an insulating property.

(Composition of a sol-gel solution for a gate insulating film)

| | |
|---|---|
| methanol (CH₃OH) | 30 ml |
| tetraethoxysirane (Si(OC₂H₅)₄) | 20 ml |
| water | 85 ml |
| hydrochloric acid (HCl) | 0.25 ml |
| acetonitrile | 8 ml |

In the next, the entire surface of the glass substrate is exposed to light, and thereafter, the substrate is dipped in a sol-gel solution having the following composition. Further, the substrate is rinsed with pure water. Thereafter, the substrate is subjected to baking at 250° C. for 60 minutes. After this baking, the portion 303b is transparent and has a conductive property.

(Composition of a sol-gel solution for a Cs transparent electrode)

| | |
|---|---|
| methanol (CH₃OH) | 30 ml |
| indiumacetylacetonate (In(COCH₂COCH₃)) | 20 ml |
| tinacetylacetonate (Sn(COCH₂COCH₃)) | 1 ml |
| water | 85 ml |
| hydrochloric acid (HCl) | 0.25 ml |
| acetonitrile | 8 ml |

Subsequent steps (formation of a TFT, a functional layer, and a pixel electrode) are performed in the same manner as in Example 12.

Meanwhile, ITO is sputtered on the opposing substrate, to form a common electrode. This opposing substrate and the TFT array substrate are arranged opposite to each other, to constitute a cell, and liquid crystal material is injected into the cell, to complete a liquid crystal display device.

Since the liquid crystal display device thus manufactured has a functional layer (e.g., a contact portion, R, G, and B portions, and a BM portion) is made of organic-inorganic hybrid glass, the apparatus achieves high reliability. The device realizes a high aperture, since a Cs portion almost corresponds to opening portion. Further, since a gate insulating film is formed by means of a process using a polysilane, a gate insulating film can be formed at lower temperature than a conventional sputtering process. In the process using a polysilane, a plastic substrate may be used.
(Example 15)

Figure 33:
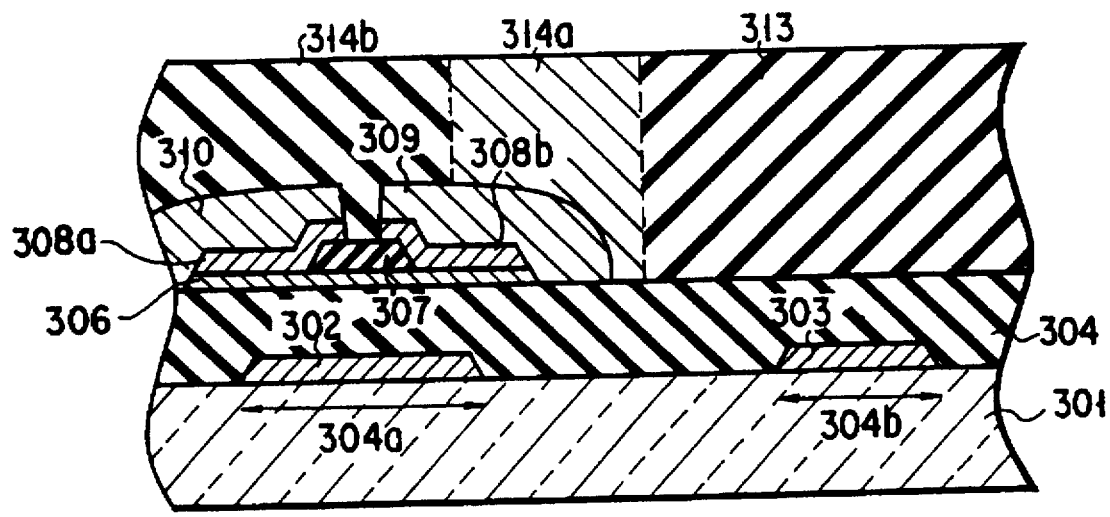

FIG. 33 is a cross-section of a substrate (or array substrate) for a display device according to Embodiment 3. In FIG. 33, the same portions as those shown in FIG. 20 are denoted by the same references as in FIG. 30, and detailed explanation thereof will be omitted herefrom.

In the substrate (or array substrate) for the display device of FIG. 33, an insulating film 304 provided on the gate line 302 and a metal portion 303a of a Cs line is made of organic-inorganic hybrid glass, to form a region which serves as a gate insulating film 304a and a region which serves as an insulating film 304b for Cs.

On the TFT and Cs line thus formed, functional layers 313, 314a, and 314b are formed. These functional layers include R, G, and B regions 313 having conductive property, a black contact region 314a, having conductive property, electrically connected to a pixel electrode 312 provided on the functional layer, and a black matrix region 314b having insulating property.

The substrate constructed in the above structure can be manufactured in the following manner. MoTa alloy is sputtered with a thickness of 300 nm on the glass substrate 301 and is subjected to patterning, thereby to simultaneously form a gate line 302, an address line (not shown), and a Cs line 303.

Subsequently, a sol-gel solution having the following composition is coated by spin-coating, and is subjected to baking at 200° C. for three hours, thereby to simultaneously form a gate insulating film 304a having a thickness of 400 nm and an insulating film 304b for Cs. This portion is transparent and has an insulating property.

| (Composition of a sol-gel solution for a gate insulating film and a Cs insulating film) | |
|---|---|
| ethanol (CH$_3$OH) | 30 ml |
| tetraethoxysirane (Si(OC$_2$H$_5$)$_4$) | 20 ml |
| water | 20 ml |
| hydrochloric acid (HCl) | 0.3 ml |

Subsequent steps (formation of a TFT and a functional layer (or contact portion)) are performed in the same manner as in Example 12.

In the next, pixel portions of R, G, and B are prepared by the same process as described above. In this case, the composition of the sol-gel solution is described below. After basing, the R, G, and B portions 313 have a conductive property.

| (Composition of a sol-gel solution for R, G, and B portions) | |
|---|---|
| pigment (average grain diameter 0.1 µm) (different between R, G, and B) | 0.5 to 1.5 g |

-continued

| (Composition of a sol-gel solution for R, G, and B portions) | |
|---|---|
| methanol (CH$_3$OH) | 30 ml |
| indiumacetylacetonate (In(COCH$_2$COCH$_3$)) | 20 ml |
| tinacetylacetonate (Sn(COCH$_2$COCH$_3$)) | 1 ml |
| water | 85 ml |
| hydrochloric acid (HCl) | 0.25 ml |
| acetonitrile | 8 ml |

In the next, the entire surface of the TFT array substrate is exposed to light. The same process as taken in Example 12 is performed to form a black matrix portion (or insulating portion) 314b. After baking, the portion 314b is black and has an insulating property.

Meanwhile, ITO is sputtered on the opposing substrate, to form a common electrode. This opposing substrate and the TFT array substrate are arranged opposite to each other, to constitute a cell, and liquid crystal material is injected into the cell, to complete a liquid crystal display device.

Since the liquid crystal display device thus manufactured has a functional layer (e.g., a contact portion, R, G, and B portions, and a BM portion) is made of organic-inorganic hybrid glass, the apparatus achieves high reliability. Further, since a gate insulating film is formed by means of a process using a polysilane, a gate insulating film can be formed at lower temperature than a conventional sputtering process. In the process using a polysilane, a plastic substrate may be used.
(Example 16)

Figure 34:
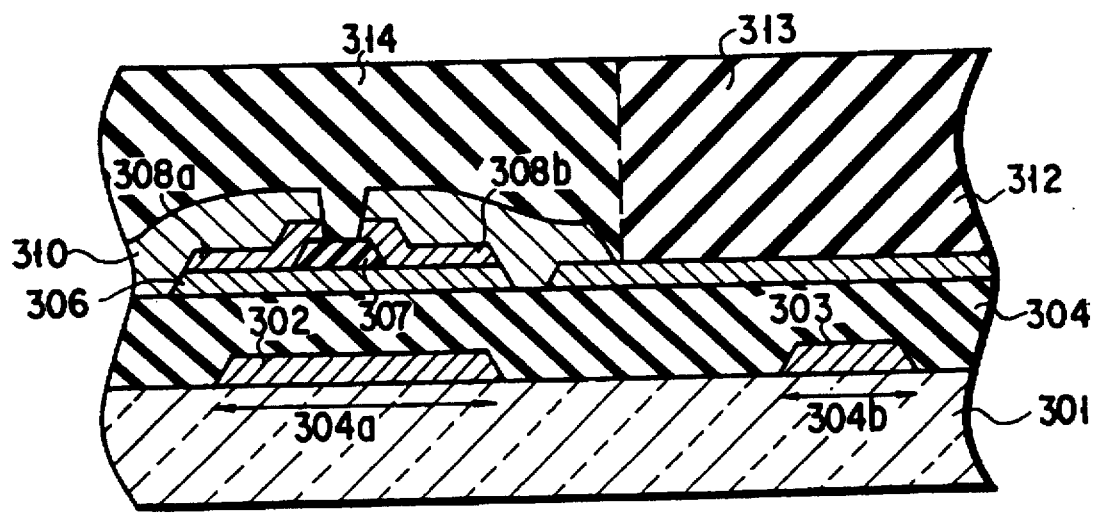

FIG. 34 is a cross-section of a substrate for a display device according to Embodiment 3. In FIG. 34, the same portions as those shown in FIG. 33 are denoted by the same references as in FIG. 33, and detailed explanation thereof will be omitted herefrom.

In the substrate (or array substrate) for the display device of FIG. 34, a pixel electrode 312 is formed on an insulating film 304b for Cs.

On the TFT and Cs line thus formed, functional layers 313 and 314 are formed. These functional layers include R, G, and B regions 313 having conductive property, and a black matrix region 314b having insulating property.

The substrate constructed in the above structure can be manufactured in the following manner. MoTa alloy is sputtered with a thickness of 300 nm on the glass substrate 301 and is subjected to patterning, thereby to simultaneously form a gate line 302, an address line (not shown), and a Cs line 303.

In the next, a gate insulating film 304a having a thickness of 400 nm and an insulating film 304b for Cs are simultaneously formed (according to Example 15). This portion is transparent and has an insulating property.

Subsequently, ITO is sputtered on the silicon oxide film 304 with a thickness of 150 µm to form a pixel electrode 312. In the next, a 5 weight % toluene solution of methylenephenylpolysilane expressed in the following formula 4 is coated at a film thickness of 2.0 µm by spin-coating, and a R pixel portion 313 is exposed with deep-UV light (280 to 320 nm) through a photo-mask. In the next, the TFT array substrate is dipped in a conductive red sol/gel solution having the following composition, and is thereafter rinsed with pure water. Further, the resultant is subjected to baking at 100° C. for 10 minutes. After the baking, the R pixel portion 313 becomes red, and has a conductive property. G and B pixel portions are formed in the same manner.

(Composition of a sol-gel solution for R, G, and B (conductive))

| | |
|---|---|
| pigments (average grain diameter 0.1 μm) (different between R, G, and B) | 0.1 to 1.5 g |
| methanol (CH$_3$OH) | 30 ml |
| indiumacetylacetonate (In(COCH$_2$COCH$_3$)) | 20 ml |
| tinacetylacetonate (Sn(COCH$_2$COCH$_3$)) | 1 ml |
| water | 85 ml |
| hydrochloric acid (HCl) | 0.25 ml |
| acetonitrile | 8 ml |

In the next, the entire surface of the TFT array substrate is exposed to light, and the process similar to the above is performed thereafter, to form a black matrix portion (or insulating portion) 314. In this case, the composition of the sol-gel solution will be described below.

(Composition of a sol-gel solution for an insulating black matrix)

| | |
|---|---|
| pigment (average grain diameter 0.3 μm, a mixture of R pigment, G pigment, B pigment, cyan pigment, violet pigment, and yellow pigment) | 5 g |
| methanol (CH$_3$OH) | 30 ml |
| tetraethoxysilane (Si(OC$_2$H$_5$)$_4$) | 20 ml |
| water | 85 ml |
| hydrochloric acid (HCl) | 0.25 ml |
| acetonitrile | 8 ml |

Meanwhile, ITO is sputtered on the opposing substrate, to form a common electrode. This opposing substrate and the TFT array substrate are arranged opposite to each other, to constitute a cell, and liquid crystal material is injected into the cell, to complete a liquid crystal display device.

Since the liquid crystal display device thus manufactured has a functional layer (e.g., a contact portion, R, G, and B portions, and a BM portion) is made of organic-inorganic hybrid glass, the apparatus achieves a low price and high reliability, and realizes a high aperture, high image quality, and a low power consumption. Further, since a gate insulating film is formed by means of a process using a polysilane, a gate insulating film can be formed at lower temperature than a conventional sputtering process. In the process using a polysilane, a plastic substrate may be used.

Embodiment 4

Embodiment 4 is designed to solve the problem in which a fine process cannot be performed when a pixel electrode is formed on the color filter layer, and the feature of this embodiment is that the pixel electrode is formed on the functional layer via an insulation film.

An example of the substrate for the display device, according to Embodiment 4, will now be described.
(Example 17)

Figure 35:
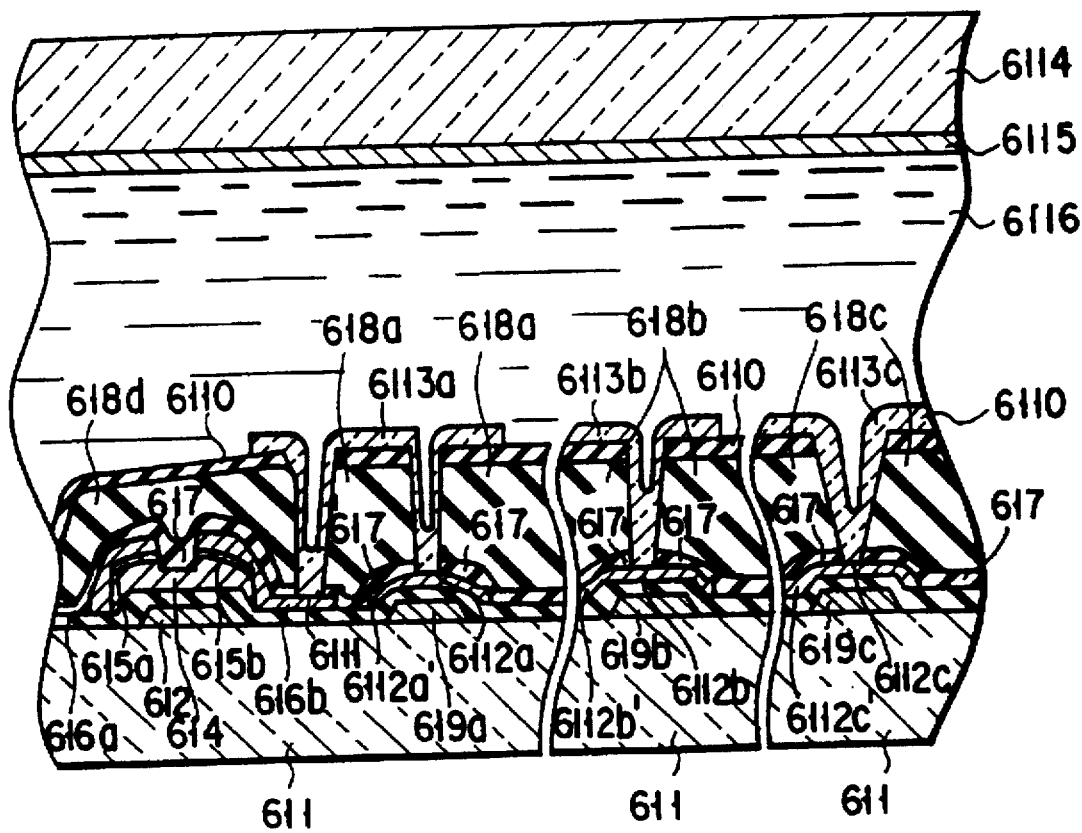
FIGS. 35 and 36 are cross-sections showing the liquid crystal display device according to Embodiment 4 of the present invention.

FIG. 35 is a cross-section of a liquid crystal display device according to Embodiment 4 of the present invention. In the figure, reference 611 denotes a glass substrate. On the glass substrate 611, a gate line 612 is formed and a silicon oxide film 613 is formed. On the silicon oxide film 613, an island-like a-Si active layer 614 is formed. A groove is provided in and separates the a-Si active layer 614. In addition, drain and source electrodes 616a and 616b are respectively formed on the separated a-Si active layers 614 with n$^+$a-Si contact layers 615a and 615b inserted therebetween. A SiNx film 617 is formed on the drain and source electrodes 616a and 616b. This SiNx film 617 is also provided in the separation groove. A polysilane functional layer (a black matrix portion 618d) made from polysilane is formed on the SiNx film 617. Further, an insulating film 6110 is formed on the functional layer 618d made from polysilane.

Meanwhile, storage capacity line (Cs line) 619a to 619c are formed on the glass substrate 611. Contact electrodes 6112a' to 6112c' are formed on the Cs lines 619a to 619c, with a silicon oxide film 613 inserted therebetween. Further, SiNx films 617, functional layers 618a to 618c made from polysilane, and an insulating film 110 are formed thereon. Contact holes 6112a to 6112c which reach the contact electrodes 6112a' to 6112c' are respectively formed above the storage capacity lines 619a to 619c, and pixel electrodes 6113a to 6113c made of ITO are respectively formed in the contact holes 6112a to 6112c. In addition, a contact hole is also formed above a source electrode 616b, and a pixel electrode 6113a made of ITO is formed in the contact hole. A TFT array substrate is thus constituted.

In addition, a glass substrate (or opposing substrate) 6114 having an opposing electrode 6115 is provided above the TFT array substrate, such that the opposing electrode 6115 faces the TFT. A liquid crystal layer 6116 is sandwiched between the TFT array substrate and the opposing substrate.

The liquid crystal display device having the above structure can be manufactured in the following manner.

At first, Mo—Ta alloy is sputtered with a thickness of 300 nm and is subjected to patterning, thereby to simultaneously form a gate line 612, an address line (or scanning line) not shown, and a Cs line (or capacity line) 619.

In the next, a silicon oxide film 613 is formed with a thickness of 350 nm by a plasma CVD method, and an a-Si layer is formed thereon to have a thickness of 300 nm. Further, n$^+$a-Si layer is formed thereon to have a thickness of 50 nm, in this order. Subsequently, the a-Si layer and n$^+$a-Si layer are subjected to patterning to form an island-like a-Si active layer 614 and n$^+$a-Si contact layers 615a and 615b are formed. In this state, the n$^+$a-Si contact layers 615a and 615b are separated from each other by performing dry etching, e.g., RIE (reactive ion etching) after source and drain electrodes are formed.

Subsequently, the SiOx film 613 at the contact portion is etched with use of dilute HF, to form contact holes for leading gate and signal lines. Next, an Al film is formed by sputtering on the n$^+$a-Si contact layers 615a and 615b, and are subjected to patterning, to simultaneously form drain and source electrodes 616a and 616b, a data line (or signal line) not shown, and contact portion electrodes 6112a' to 6112c'. The contact portion electrodes 6112a' to 6112c' are respectively connected with pixel electrodes 6113a to 6113c, to be kept at an equal potential, so that a Cs capacity is formed between the Cs line and the contact portion electrodes. Thereafter, an SiNx film 617 is formed by plasma CVD on the drain and source electrodes 616a and 616b, and the contact portion electrodes 6112a' to 6112c'.

In the next, polysilane resist is coated on the SiNx film 617 by spin-coating or the like, and is prebaked to form a polysilane film. The polysilane film is selectively exposed with ultraviolet light, to form a latent image of a dye color pattern. After the latent image is formed, the substrate is dipped in a dipping solution containing a basic dye, thereby to subject the polysilane film to pattern dyeing, and thereafter, the exposed portion is vitrificated by baking. The above exposure, dipping, and baking are repeated three times for each of R, G, and B, thereby to form coloring portions 618a to 618c. In the next, the entire surface is exposed to light to form latent images in all portions not vitrificated, and thereafter, the substrate is dipped in a carbon black sol to perform vitrificating of the color portions and the black matrix portion. The resultant is postbaked at 250° C. for about 60 minutes, to perform dying the black matrix portion 618d. Thus, a color filter and a black matrix are prepared on the TFT array substrate.

Subsequently, an SiOx insulating film 6110 as a protect film is formed with a thickness of 10 nm by plasma CVD, and thereafter, the SiNx film 617 of the contact portions 6111 and 6112, the functional layer 618, and SiOx 617 are subjected to dry etching by a mixture gas of $CF_4+O_2$, to form a contact hole. The resultant is subjected to sputtering with use of ITO and to patterning, to form pixel electrodes 6113a to 6113c.

Meanwhile, ITO is sputtered on the opposing substrate 6114, to form a common electrode 6115. The opposing substrate 6114 and the TFT array substrate 611 are arranged opposite to each other, to form a cell. Liquid crystal material is injected into the cell, to complete a liquid crystal display device.

Although etching of ITO is performed mainly with use of a mixture solution of $HCl+HNO_3+H_2O$, the adhesion between ITO and a color filter is not excellent and the side-etching reaches 1 μm or more if an ITO film is formed directly on the color filter made from polysilane. However, if an SiOx insulating film is formed by plasma CVD after a color filter is formed, and if an ITO film is formed with the SiOx insulating film inserted therebetween, as in the present invention, the adhesion of the ITO film is improved and the side-etching is reduced to 0.5 μm or less, so that pixel electrodes are formed at a high pattern precision.

Further, in an ITO film formed by sputtering, the grain diameter of crystal particulate greatly varies, depending on the underlayer, and therefore, an ITO film in which the film quality such as a resistance and a transmittance varies depending on respective pigments of R, G, and B is formed, if the ITO film is directly formed on a color filter made from polysilane colored with dyes or pigments. In addition, there has been a case in which ITO becomes cloudy due to conditions of film formation. However, according to the present invention, pixel electrodes of excellent quality having a uniform film quality can be formed without being influenced under the respective pigments of R, G, and B, by using an insulating film as a protect film on the color filter made of polysilane. In this state, if the film thickness is 10 nm or more, flattening can be realized and influences from pigments can be prevented.

(Example 18)

Figure 36:
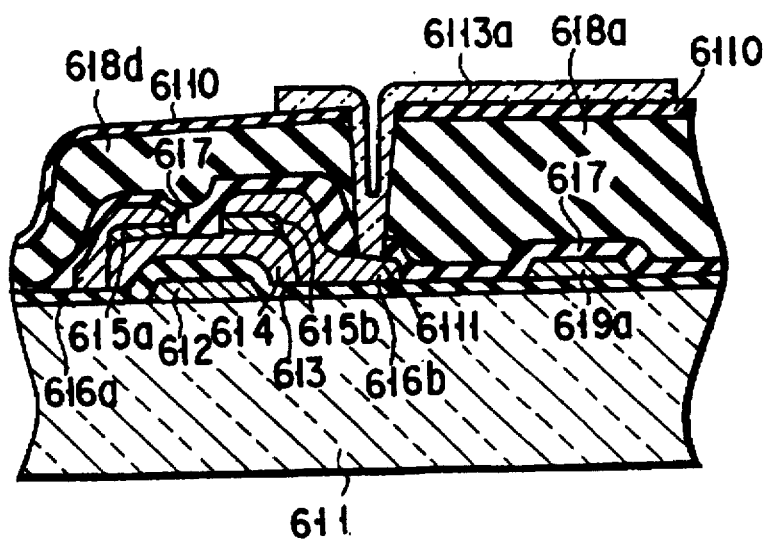

FIG. 36 is a cross-section of an array substrate of the liquid crystal display device according to Embodiment 4 of the present invention. Note that the same portions as those of FIG. 35 are denoted by the same references as used in FIG. 35, and detailed explanation thereof will be omitted herefrom.

In Example 17, explanation has been made to a case in which the storage capacity is made of the gate insulating film. However, in Example 18, explanation will be made to a structure in which a color filter made from polysilane serves also as the storage capacity. In this case, the film thickness of the insulating film on the color filter made of polysilane should preferably be thin, e.g., 10 nm to 50 nm or so, in order to prevent an increase in the storage capacity.

In the array substrate, a contact electrode 6112' is not provided on the Cs line 619a. Specifically, a Cs line 619a is formed on the glass substrate 611 with a silicon oxide film 613 inserted therebetween, and a functional layer 618a made from polysilane is formed on the Cs line 619a with an SiNx film 617 inserted therebetween.

The array substrate constructed in the above structure can be manufactured in the following manner. At first, Mo—Ta alloy is sputtered with a thickness of 300 nm on the glass substrate 611 and is patterned, thereby to simultaneously form a gate line 612 and an address line (or scanning line) not shown.

In the next, a silicon oxide film 613 is formed with a thickness of 350 nm by plasma CVD, and a-Si layer is formed thereon with a thickness of 300 nm. Further, an $n^+$a-Si layer is formed thereon with a thickness of 50 nm, in this order. Subsequently, the a-Si layer and $n^+$a-Si layer are subjected to patterning to form an island-like a-Si active layer 614 and $n^+$a-Si contact layers 615a and 615b are formed. In this state, the $n^+$a-Si contact layers 615a and 615b are separated from each other by performing, for example, RIE or the like after source and drain electrodes are formed.

Subsequently, the SiOx film for leading portions of gate and signal lines is etched with use of dilute HF, to form contact holes. Next, an Al film is formed by sputtering on the $n^+$a-Si contact layers 615a and 615b, and are subjected to patterning, to simultaneously form drain and source electrodes 616a and 616b, a data line (or signal line) not shown, and a capacity line (Cs line) 619. Thereafter, SiNx 617 is formed thereon by plasma CVD.

In the next, polysilane is coated on the SiNx film 617 by spin-coating or the like, and is prebaked to form a polysilane film. The polysilane film is selectively exposed with ultraviolet light, to form a latent image of a dye color pattern. After the latent image is formed, the array substrate is dipped in a dipping solution containing a basic dye, thereby to subject the polysilane film to pattern dyeing, and thereafter, exposed portions are vitrificated by baking. The above exposure, dipping, and baking are repeated three times for each of R, G, and B, thereby to form coloring portion 618a (618b, and 618c). In the next, the entire surface is exposed to light, and thereafter, the substrate is dipped in a carbon black sol to perform dying the black matrix portion. The resultant is postbaked at 250° C. for about 60 minutes, to perform vitrificating of the black matrix portion 618d. Thus, a color filter and a black matrix are prepared on the TFT array substrate.

Subsequently, an SiOx insulating film 6110 as a protect film is formed with a thickness of 10 nm by plasma CVD, and thereafter, a pad electrode portion, SiNx, the color filter, and SiOx of a contact portion 6111 are subjected to dry etching by a mixture gas of $CF_4+O_2$, to form contact holes. The resultant is subjected to sputtering with use of ITO and to patterning, to form pixel electrodes 6113a (6113b and 6113c).

Meanwhile, ITO is sputtered on the opposing substrate, to form a common electrode. The opposing substrate and the TFT array substrate 611 are arranged opposite to each other, to form a cell. Liquid crystal material is injected into the cell, to complete a liquid crystal display device.

According to this Example 18, since the color filter serves also as an insulating film of the storage capacity, a contact portion electrode which is required in Example 17 need not be formed any more.

The techniques discussed in above Embodiments 1 to 4 can be performed in combination in accordance with necessity.

The present invention provides the following advantages.

First, according to the present invention, a various functions can be imparted to the organic-inorganic hybrid glass made of the same layer. Such a functional layer is formed on the TFT and therefore the layer is able to serve also as a flatness layer. With this structure, the irregular configuration of the surface of the array substrate can be remarkably smoothed, and those having a high-speed response mode, which requires a strict gap control accuracy, can be obtained at a high yield. Further, a high degree of smoothness can be achieved, the aperture ratio can be rendered 90% or higher, and the consumption power can be maintained low.

Second, the method in which a polysilane-made functional layer is provided on an array substrate, involves the number of steps less than that of the conventional pigment dispersed method. Consequently, the damage to the TFT is less, and a TFT irregular error, which raise a problem particular in the case of a wide screen, does not occur. Therefore, wide-screen displays can be provided at a high yield.

Third, in the method utilizing the polysilane-made functional layer, various functions are imparted to the same layer, and therefore the amount of the material can be reduced. Further, with the structure discussed in the above Embodiments 1 to 4, the yield of the product can be further improved.

What is claimed is:

1. An array substrate for use in a display device, comprising:
   (i) a switching element on a substrate;
   (ii) a functional layer on said substrate, comprising
      (a) insulating organic-inorganic hybrid glass, and
      (b) conducting organic-inorganic hybrid glass; and
   (iii) a pixel electrode on said functional layer;
   wherein said pixel electrode is electrically connected to said switching element via said conducting organic-inorganic hybrid glass.

2. The array substrate of claim 1, wherein at least a part of said insulating organic-inorganic hybrid glass is colored.

3. The array substrate of claim 1, wherein said insulating organic-inorganic hybrid glass is a gate insulating film of said switching element.

4. The array substrate of claim 1, further comprising a storage capacitance line on said substrate, wherein said insulating organic-inorganic hybrid glass is an insulator of a capacitor for said storage capacitance line.

5. The array substrate of claim 1, further comprising an insulating film between said insulating organic-inorganic hybrid glass and said pixel electrode.

6. The array substrate of claim 1, wherein said pixel electrode is on said insulating organic-inorganic hybrid glass.

7. An array substrate for use in a display device, comprising:
   (i) a switching element on a substrate, and
   (ii) a functional layer on said substrate, comprising a pixel electrode,
   said pixel electrode comprising a colored conductive organic-inorganic hybrid glass.

8. The array substrate of claim 7, wherein said functional layer further comprises insulating organic-inorganic hybrid glass.

9. The array substrate of claim 8, wherein said colored conductive organic-inorganic hybrid glass is divided by said insulating organic-inorganic hybrid glass.

10. The array substrate of claim 8, wherein said insulating organic-inorganic hybrid glass is colored and is a black matrix.

11. A liquid crystal display device, comprising:
   (I) an array substrate comprising
      (i) a switching element on a substrate;
      (ii) a functional layer on said substrate, comprising
         (a) insulating organic-inorganic hybrid glass, and
         (b) conducting organic-inorganic hybrid glass; and
      (iii) a pixel electrode on said functional layer; and
   (II) an opposing substrate opposite said array substrate; and
   (III) a layer comprising a liquid crystal, between said array substrate and said opposing substrate;
   wherein said pixel electrode is electrically connected to said switching element via said conducting organic-inorganic hybrid glass.

12. The device of claim 11, wherein at least a part of said insulating organic-inorganic hybrid glass is colored.

13. The device of claim 11, wherein said insulating organic-inorganic hybrid glass is a gate insulating film of said switching element.

14. The device of claim 11, further comprising a storage capacitance line on said substrate, wherein said insulating organic-inorganic hybrid glass is an insulator of a capacitor for said storage capacitance line.

15. The device of claim 11, further comprising an insulating film between said insulating organic-inorganic hybrid glass and said pixel electrode.

16. The device of claim 11, wherein said pixel electrode is on said insulating organic-inorganic hybrid glass.

17. A liquid crystal display device, comprising:
   (I) an array substrate comprising
      (i) a switching element on a substrate, and
      (ii) a functional layer on said substrate, comprising a pixel electrode, said pixel electrode comprising a colored conductive organic-inorganic hybrid glass;
   (II) an opposing substrate opposite said array substrate; and
   (III) a layer comprising a liquid crystal, between said array substrate and said opposing substrate.

18. The device of claim 17, wherein said functional layer further comprises insulating organic-inorganic hybrid glass.

19. The device of claim 18, wherein said colored conductive organic-inorganic hybrid glass is divided by said insulating organic-inorganic hybrid glass.

20. The device of claim 18, wherein said insulating organic-inorganic hybrid glass is colored and is a black matrix.

* * * * *